US011056105B2

United States Patent
Robinson et al.

(10) Patent No.: US 11,056,105 B2
(45) Date of Patent: Jul. 6, 2021

(54) TALK BACK FROM ACTIONS IN APPLICATIONS

(71) Applicant: AIQUDO, INC., San Jose, CA (US)

(72) Inventors: Mark Robinson, Union City, CA (US); Matan Levi, Belmont, CA (US); Kiran Bindhu Hemaraj, Trivandrum (IN); Rajat Mukherjee, San Jose, CA (US)

(73) Assignee: AIQUDO, INC, Campbell, CA (US)

( * ) Notice: Subject to any disclaimer, the term of this patent is extended or adjusted under 35 U.S.C. 154(b) by 207 days.

(21) Appl. No.: 15/936,007

(22) Filed: Mar. 26, 2018

(65) Prior Publication Data

US 2018/0336893 A1 Nov. 22, 2018

Related U.S. Application Data

(60) Provisional application No. 62/610,792, filed on Dec. 27, 2017, provisional application No. 62/576,766, (Continued)

(51) Int. Cl.
*G10L 15/22* (2006.01)
*G10L 15/30* (2013.01)
(Continued)

(52) U.S. Cl.
CPC ............. *G10L 15/22* (2013.01); *G06F 3/167* (2013.01); *G10L 15/1815* (2013.01);
(Continued)

(58) Field of Classification Search
CPC ..... G10L 15/00; G10L 15/22; G10L 15/1815; G10L 15/30; G06F 3/167
(Continued)

(56) References Cited

U.S. PATENT DOCUMENTS

| 5,600,711 | A | 2/1997 | Yuen |
| 6,173,266 | B1 * | 1/2001 | Marx ..................... G10L 15/22 |
| | | | 704/270 |

(Continued)

FOREIGN PATENT DOCUMENTS

| EP | 2 386 975 A2 | 11/2011 |
| EP | 2760015 A1 | 7/2014 |
| WO | 2016/109366 A1 | 7/2016 |

OTHER PUBLICATIONS

First Action Interview Preinterview Communication dated Nov. 29, 2019 in U.S. Appl. No. 16/038,993, 6 pages.
(Continued)

*Primary Examiner* — Michael Colucci
(74) *Attorney, Agent, or Firm* — Shook, Hardy & Bacon L.L.P.

(57) ABSTRACT

Embodiments of the present invention provide systems, methods, and computer storage media directed to providing talk back automation for applications installed on a mobile device. To do so actions (e.g., talk back features) can be created, via the digital assistant, by recording a series of events that are typically provided by a user of the mobile device when manually invoking the desired action. At a desired state, the user may select an object that represents the output of the application. The recording embodies the action and can be associated with a series of verbal commands that the user would typically announce to the digital assistant when an invocation of the action is desired. In response, the object is verbally communicated to the user via the digital assistant, a different digital assistant, or even another device. Alternatively, the object may be communicated to the same application or another application as input.

19 Claims, 13 Drawing Sheets

Related U.S. Application Data filed on Oct. 25, 2017, provisional application No. 62/539,866, filed on Aug. 1, 2017, provisional application No. 62/576,804, filed on Oct. 25, 2017, provisional application No. 62/509,534, filed on May 22, 2017, provisional application No. 62/508,181, filed on May 18, 2017.

(51) Int. Cl.
 *G10L 15/18* (2013.01)
 *G06F 3/16* (2006.01)
 *G10L 13/04* (2013.01)

(52) U.S. Cl.
 CPC .............. *G10L 15/30* (2013.01); *G10L 13/04* (2013.01); *G10L 2015/223* (2013.01); *G10L 2015/228* (2013.01)

(58) Field of Classification Search
 USPC .... 704/235, 272, 254, 275, 9; 717/108, 107, 717/143, 106, 116, 114, 101; 715/229, 715/273
 See application file for complete search history.

(56) References Cited

U.S. PATENT DOCUMENTS

| | | | |
|---|---|---|---|
| 6,535,912 B1 | 3/2003 | Anupam et al. | |
| 6,636,831 B1* | 10/2003 | Profit, Jr. | H04M 3/4938 704/270 |
| 6,678,864 B1* | 1/2004 | Tsai | H04L 63/083 715/229 |
| 7,024,348 B1* | 4/2006 | Scholz | G06F 8/38 703/24 |
| 7,440,895 B1* | 10/2008 | Miller | G10L 15/01 704/231 |
| 7,546,576 B2* | 6/2009 | Egli | H04L 29/06 715/239 |
| 7,729,919 B2* | 6/2010 | Wang | G06F 8/656 704/275 |
| 8,160,883 B2* | 4/2012 | Lecoeuche | H04M 1/72445 704/270.1 |
| 8,473,949 B2 | 6/2013 | Horvitz et al. | |
| 9,123,336 B1 | 9/2015 | Uszkoreit et al. | |
| 9,384,732 B2 | 7/2016 | Bishop et al. | |
| 9,412,392 B2 | 8/2016 | Lindahl | |
| 9,479,831 B2 | 10/2016 | Oostveen et al. | |
| 10,007,500 B1 | 6/2018 | Suraci | |
| 10,209,956 B2 | 2/2019 | Fletcher et al. | |
| 10,466,963 B2 | 11/2019 | Levi et al. | |
| 10,489,405 B2 | 11/2019 | Zheng et al. | |
| 10,528,605 B2 | 1/2020 | Braga et al. | |
| 2002/0032564 A1* | 3/2002 | Ehsani | G06F 40/289 704/235 |
| 2003/0212561 A1* | 11/2003 | Williams | H04M 3/5191 704/270.1 |
| 2005/0010418 A1* | 1/2005 | McNair | G06F 3/038 704/275 |
| 2005/0010892 A1* | 1/2005 | McNair | G06F 8/38 717/101 |
| 2005/0097618 A1 | 5/2005 | Arling et al. | |
| 2005/0135338 A1* | 6/2005 | Chiu | H04M 3/42144 370/352 |
| 2005/0240917 A1* | 10/2005 | Wu | G06F 8/71 717/162 |
| 2006/0294509 A1* | 12/2006 | Mital | G06F 9/451 717/143 |
| 2008/0021708 A1 | 1/2008 | Bennett et al. | |
| 2008/0120616 A1 | 5/2008 | James et al. | |
| 2008/0221715 A1 | 9/2008 | Krzyzanowski et al. | |
| 2009/0249206 A1 | 10/2009 | Stahlberg | |
| 2009/0307162 A1 | 12/2009 | Bui et al. | |
| 2010/0036676 A1* | 2/2010 | Safdi | G16H 15/00 705/2 |
| 2010/0082398 A1 | 4/2010 | Davis et al. | |
| 2010/0088100 A1 | 4/2010 | Lindahl | |
| 2011/0066634 A1* | 3/2011 | Phillips | G10L 15/22 707/769 |
| 2012/0035932 A1 | 2/2012 | Jitkoff et al. | |
| 2012/0066600 A1* | 3/2012 | Nickel | G10L 15/26 715/727 |
| 2012/0209613 A1* | 8/2012 | Agapi | G10L 15/22 704/270.1 |
| 2013/0152092 A1 | 6/2013 | Yadgar | |
| 2013/0329086 A1 | 12/2013 | Malone | |
| 2014/0074481 A1 | 3/2014 | Newman | |
| 2014/0074483 A1 | 3/2014 | van Os | |
| 2014/0108013 A1 | 4/2014 | Di Cristo et al. | |
| 2014/0115456 A1* | 4/2014 | White | G10L 15/22 715/708 |
| 2014/0136187 A1 | 5/2014 | Wolverton et al. | |
| 2014/0222436 A1 | 8/2014 | Binder et al. | |
| 2014/0278413 A1 | 9/2014 | Pitschel et al. | |
| 2014/0282003 A1 | 9/2014 | Gruber et al. | |
| 2014/0297282 A1* | 10/2014 | Peters | G10L 15/19 704/254 |
| 2015/0032451 A1 | 1/2015 | Gunn et al. | |
| 2015/0045003 A1 | 2/2015 | Vora et al. | |
| 2015/0089373 A1* | 3/2015 | Dwivedi | G06F 3/167 715/728 |
| 2015/0120723 A1 | 4/2015 | Deshmukh et al. | |
| 2015/0180967 A1 | 6/2015 | Takagishi | |
| 2015/0242385 A1* | 8/2015 | Bao | G06F 40/211 704/9 |
| 2015/0248730 A1* | 9/2015 | Pilot | G06Q 40/08 705/4 |
| 2015/0302850 A1* | 10/2015 | Lebrun | G06F 40/35 704/243 |
| 2015/0348551 A1 | 12/2015 | Gruber et al. | |
| 2015/0373183 A1 | 12/2015 | Woolsey et al. | |
| 2016/0004974 A1 | 1/2016 | Pope | |
| 2016/0077853 A1* | 3/2016 | Feng | G06F 9/54 719/328 |
| 2016/0225370 A1 | 8/2016 | Kannan et al. | |
| 2016/0225371 A1 | 8/2016 | Agrawal et al. | |
| 2016/0259623 A1 | 9/2016 | Sumner et al. | |
| 2016/0358603 A1 | 12/2016 | Azam et al. | |
| 2016/0378279 A1 | 12/2016 | Sirpal et al. | |
| 2016/0378325 A1 | 12/2016 | Hurley et al. | |
| 2016/0378439 A1* | 12/2016 | Straub | G06F 8/61 717/107 |
| 2017/0069177 A1 | 3/2017 | Takahata et al. | |
| 2017/0093781 A1 | 3/2017 | Sharma et al. | |
| 2017/0116982 A1* | 4/2017 | Gelfenbeyn | G10L 15/22 |
| 2017/0193123 A1* | 7/2017 | Jones | G06Q 20/405 |
| 2018/0174577 A1* | 6/2018 | Jothilingam | G10L 15/07 |
| 2018/0308476 A1* | 10/2018 | Hirzel | G06F 40/35 |
| 2018/0336049 A1 | 11/2018 | Mukherjee et al. | |
| 2018/0336885 A1 | 11/2018 | Mukherjee et al. | |
| 2018/0350353 A1 | 12/2018 | Gruber et al. | |
| 2018/0366108 A1 | 12/2018 | Mukherjee et al. | |
| 2018/0366113 A1 | 12/2018 | Hemaraj et al. | |
| 2019/0132436 A1 | 5/2019 | Jang et al. | |
| 2019/0208130 A1 | 7/2019 | Nara et al. | |
| 2019/0347118 A1 | 11/2019 | Mukherjee et al. | |

OTHER PUBLICATIONS

Non-Final Office Action dated Nov. 29, 2019 in U.S. Appl. No. 15/936,001, 16 pages.
First Action Interview Preinterview Communication dated Jan. 15, 2020 in U.S. Appl. No. 15/984,122, 5 pages.
First Action Interview Preinterview Communication dated Jan. 16, 2020 in U.S. Appl. No. 16/110,108, 5 pages.
First Action Interview Preinterview Communication dated Oct. 9, 2019 in U.S. Appl. No. 16/110,103, 3 pages.
International Search Report and Written Opinion dated Apr. 11, 2019 in International Patent Application No. PCT/US2019/015839, 13 pages.
International Search Report and Written Opinion dated Aug. 9, 2018 in International Patent Application No. PCT/US18/33425, 10 pages.

(56) References Cited

OTHER PUBLICATIONS

International Search Report and Written Opinion dated Aug. 24, 2018 in International Patent Application No. PCT/US18/33446, 9 pages.
International Search Report and Written Opinion dated Oct. 21, 2019 in International Patent Application No. PCT/US19/42453, 14 pages.
International Preliminary Report on Patentability dated Aug. 2, 2019 in International Patent Application No. PCT/US2018/033518, 17 pages.
International Preliminary Report on Patentability dated Aug. 19, 2019 in International Patent Application No. PCT/US2018/033425, 18 pages.
International Search Report and Written Opinion dated Oct. 18, 2018 in International Patent Application No. PCT/US18/48066, 10 pages.
International Search Report and Written Opinion dated Oct. 29, 2018 in International Patent Application No. PCT/US18/33518, 12 pages.
International Search Report and Written Opinion dated Nov. 19, 2018 in International Patent Application No. PCT/US18/48064, 7 pages.
Final Office Action dated Jul. 24, 2020 in U.S. Appl. No. 16/110,103, 17 pages.
International Preliminary Report on Patentability for PCT Application No. PCT/US2018/048064 dated May 7, 2020, 6 pages.
International Preliminary Report on Patentability for PCT Application No. PCT/US2018/048066 dated May 7, 2020, 9 pages.
Preinterview First Office Action dated Feb. 13, 2020, in U.S. Appl. No. 16/261,657, 5 pages.
First Action Interview Office Action dated Mar. 2, 2020, in U.S. Appl. No. 15/984,122, 3 pages.
First Action Interview Office Action dated Mar. 3, 2020, in U.S. Appl. No. 16/038,993, 16 pages.
First Action Interview Office Action dated Mar. 16, 2020, in U.S. Appl. No. 16/110,108, 6 pages.
Notice of Allowance dated Apr. 28, 2020, in U.S. Appl. No. 16/261,657, 7 pages.
Final Office Action dated Aug. 4, 2020 in U.S. Appl. No. 15/984,122, 18 pages.
International Preliminary Report on Patentability received for PCT Application No. PCT/US2019/015839, dated Aug. 13, 2020, 12 pages.
Final Office Action dated Aug. 17, 2020 in U.S. Appl. No. 15/936,001, 35 pages.
Notice of Allowance dated Aug. 19, 2020 in U.S. Appl. No. 16/038,993, 7 pages.
Final Office Action dated Sep. 18, 2020 in U.S. Appl. No. 16/110,108, 17 pages.
Notice of Allowance dated Nov. 6, 2020 in U.S. Appl. No. 16/038,993, 6 pages.
International Preliminary Report on Patentability received for PCT Application No. PCT/US2019/042453, dated Jan. 28, 2021, 7 pages.
Notice of Allowance dated Feb. 8, 2021 in U.S. Appl. No. 16/038,993, 6 pages.
Extended European Search Report and Opinion received for European Patent Application No. 18802499.6, dated Apr. 9, 2021, 9 pages.
Mechling, L. C., et al., "Using a Personal Digital Assistant to Increase Independent Task Completion by Students with Autism Spectrum Disorder", pp. 1420-1435 (May 23, 2009).
Non-Final Office Action dated May 11, 2021 in U.S. Appl. No. 16/110,108, 18 pages.
Non-Final Office Action dated May 25, 2021 in U.S. Appl. No. 15/936,001, 28 pages.
Extended European Search Report and Opinion received for European Patent Application No. 18802605.8, dated Apr. 14, 2021, 8 pages.

* cited by examiner

TALK BACK FROM ACTIONS IN APPLICATIONS

CROSS-REFERENCE TO RELATED APPLICATIONS

This application is related by subject matter to and claims the benefit of U.S. Provisional Patent Application No. 62/508,181, filed May 18, 2017, entitled "SYSTEMS AND METHODS FOR CROWDSOURCED ACTIONS AND COMMANDS," U.S. Provisional Patent Application No. 62/509,534, filed May 22, 2017, entitled "CONNECTING MULTIPLE MOBILE DEVICES TO A SMART HOME ASSISTANT ACCOUNT," U.S. Provisional Patent Application No. 62/576,804, filed Oct. 25, 2017, entitled "CONNECTING MULTIPLE MOBILE DEVICES TO A SMART HOME ASSISTANT ACCOUNT," U.S. Provisional Patent Application No. 62/539,866, filed Aug. 1, 2017, entitled "OPTIMIZING DISPLAY ENGAGEMENT IN ACTION AUTOMATION," U.S. Provisional Patent Application No. 62/576,766, filed Oct. 25, 2017, entitled "A CROWD-SOURCED DIGITAL ASSISTANT SYSTEM," and U.S. Provisional Patent Application No. 62/610,792, filed Dec. 27, 2017, entitled "TALK BACK FROM ACTIONS IN APPLICATIONS," which are incorporated herein by reference in their entirety.

BACKGROUND

Digital assistants have become ubiquitous in a variety of consumer electronic devices. Modern day digital assistants employ speech recognition technologies to provide a conversational interface between users and electronic devices. These digital assistants can employ various algorithms, such as natural language processing, to improve interpretations of commands received from a user. Consumers have expressed various frustrations with conventional digital assistants due to privacy concerns, constant misinterpretations of spoken commands, unavailability of services due to weak signals or a lack of signal, and the general requirement that the consumer must structure their spoken command in a dialect that is uncomfortable for them.

Moreover, as the general pace of society continues to accelerate, so do users' desires to consume readily-available information. Digital assistants enable a seamless interface between users and their devices, and can provide a much faster means for the exchange of input and output information. One digital assistant, particularly the "Q" digital assistant developed by Aiqudo Inc., headquartered in San Jose, Calif., has integrated automation into the digital assistant. In other words, the "Q" digital assistant can, among many other things, perform a series of predefined tasks (e.g., "actions") based on a received command to accomplish a desired result.

Further, the actions resulting from these commands in existing digital assistants typically do not execute the functions within mobile applications already available on the mobile devices, such as phones, tablets, watches, connected glasses, etc., which are often what users would like to do when on the move. Moreover, feedback (e.g., output from the applications) is not currently provided to users in a verbal format via digital assistants or locally on the devices via the applications.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Embodiments described in the present disclosure are generally directed towards techniques relating to a crowd-sourced digital assistant for computing devices, particularly devices that are physically with the user (e.g., cell phones, connected watches, devices tethered to cars, etc.). In particular, embodiments facilitate an intuitive creation and automatic distribution of actions, and associated commands to invoke the actions, to provide a digital assistant that can perform any action on a computing device, limited only by the functionality of the computing device and its applications installed thereon. In some embodiments, actions can be created, via the digital assistant, by recording a series of events that are typically provided by a user of the mobile device when manually invoking the desired action. That is, once recording of an action begins, a user can simply perform the series of operations or events (e.g., manual inputs) within an application to a desired state. At the desired state, the user may select an object (e.g., a talk back object) that may represent the output of the application at the desired state. The recording, once completed by the user, embodies the action and can be associated with a series of verbal commands that the user would typically announce to the digital assistant when an invocation of the action is desired. The digital assistant can include the series of events and identifying information of the application, among other things, to generate a new action (e.g., a talk back feature) that can be invoked by simply announcing, to the digital assistant, one of the verbal commands (or a command that is similar to one of the verbal commands) associated with the action. In response, the talk back object is verbally communicated to the user via the digital assistant, a different digital assistant, or even another device. In some embodiments, the object may be communicated to the same application or another application as input, e.g., and input parameter to another action. In some aspects, the digital assistant can also facilitate the modification and/or deletion of actions or commands, among other things, associated therewith.

In some further embodiments, an action, once created by the digital assistant, can be uploaded to a server for storage thereon. The server, upon receiving the new action, can analyze the action and generate an associated signature based on the characteristics of the received action. In one aspect, the server may be able to determine that the new action already exists on the server, based on a determination that the signature of the new action matches that of another action already stored on the server. In this regard, the server can either dispose of the new action or merge the new action with the existing action to avoid redundancy and save storage space, as well as combine the commands of the two duplicate actions in the system. In another aspect, the server can analyze the new action to determine if its contents (e.g., the performed events, commands, metadata) are in accordance with one or more policies associated with utilization of the digital assistant. In another aspect, the server can employ machine learning algorithms, among other things, to generate additional commands and/or the talk back output for association with the new action.

In some further embodiments, the server can distribute one or more new actions to a plurality of other computing devices having an instance of the digital assistant executing thereon. In this way, each user of the plurality of computing devices can simply announce one of the commands associated with the new action to perform the exact same series of events to achieve the desired result. In other words, provided that the user has the application corresponding to the distributed new action installed on their computing device, without configuration or additional interaction with the digital assistant, the user can simply announce one of the commands associated with the distributed new action to achieve the desired result, including receiving the talk back object from the specific action.

In some further embodiments, the actions presented to the user can be filtered to only include the applications available to the user, since the system can detect the specific applications installed on the user's device. Matching actions can also be re-ordered based on the usage of the applications on the device, so that an application that is more frequently used by the user is given a higher preference than an application that is installed on the device, but not used frequently. The user does not need to specify the target application explicitly, as in other digital assistants, making the commands to invoke these actions very natural and contextual.

In some further embodiments, any user can customize commands associated with an action that corresponds to an application installed on their computing device. Very simply, a user can employ the digital assistant to identify the application from a list of installed applications, select an option to add a new command to the action, and announce a new command for association with the action. In this regard, the user can create any custom command to invoke the action with which the custom command is associated. In some aspects, the custom command and/or modified action can be uploaded to the server for analysis, as noted above. In some further aspects, based on the analysis, the server can distribute the custom command and/or modified action to a plurality of other computing devices having an instance of the digital assistant executing thereon. It is also possible that some of these commands are used in training the machine learning command matching algorithm, and other commands that are not suitable are dropped from the training model. In this regard, the list of possible actions and associated commands can continue to grow and become automatically available to any user of the digital assistant, or to the machine learning algorithms that are trained using these commands to create a more robust matching model for user commands In some further embodiments, some commands may require a parameter that can be passed to the associated application. In other words, a command to invoke an action may, in some instances, need a parameter (e.g., a variable) to invoke the action and achieve a specific result that is based on the provided parameter. In some aspects, the digital assistant can facilitate the inclusion of one or more parameters into the commands associated with a new or modified action. In some further aspects, the digital assistant can intuitively provide the user with one or more datatypes for association with the required parameter(s). By way of example, an announced command to "I need a hotel room," may cause the digital assistant to invoke a hotel application on the computing device. However, an announced command of "Is a hotel room available," may require one or more parameters that corresponds to a location, a date, a duration, and/or a room type. In this regard, and by way of a non-limiting example, a "I need a hotel room" command associated with the hotel application may require the user to announce parameters in addition to a command, such as "Is a hotel room available this weekend." If the user does not announce such parameters, the action may be configured to verbally seek such information from the user, such as "Yes, a room is available. How many days will you be staying?" In another non-limiting example, another "Is a hotel room available" command associated with the hotel application may require the user to announce a location, a date, a duration, and/or a room type in addition to the command, such as "Is a hotel room available from Dec. 5, 2017 to Dec. 15, 2017 in San Jose for three people." In response, the action may be configured to verbally seek a response from the user, such as "Yes, a room is available. Would you like to book the room?" based on the information in the talk back object representing room availability. In some aspects, and as noted above, the server can employ machine learning technology, among other things, to determine a plurality of variations of the command and/or the talk back output with and/or without parameters, based on new commands and/or talk back outputs received by users of the digital assistant, available fields of the associated application, metadata, entity types, similar applications, commands, and/or talk back outputs, and the like. In some aspects, the commands and/or talk back outputs used for training the machine learning algorithm can be used to create command and/or talk back output templates after removal of the specific instances of the parameter, so as to match other instances of parameterized commands and actions, e.g., "Would you like to book the room" (i.e., the action and the commands are generalized from specific examples).

In further embodiments, the talk back object may be presented visually to the user, e.g., on screen, for example, if the device is in silent mode, or if the volume controls have been turned down, or the receiving device has no/reduced/disabled audio capability. In yet other embodiments, both visual and audio presentation may be required. Further, the talk back object may be decoded to provide other audio signals e.g., specific different audible sounds for a "yes" state or a "no" response, or other visual signals, e.g., green light for "yes" and a red light for "no."

In accordance with embodiments described herein, the described digital assistant and corresponding system provides an ever-growing and customizable dialect that enables the digital assistant to learn from its users, in contrast to the frustrating and limited interpretation features provided by conventional digital assistants. Further, because the digital assistant and corresponding system is configured primarily as a framework for distributing improvements to its collection of actions and commands, and because the digital assistant utilizes applications existing on the computing device of each user, privacy concerns typically associated with conventional digital assistants is significantly reduced. Further, because such actions include invocation of functionality on devices, such as mobile phones and other similar devices always available to the user, these actions provide instant gratification to the mobile user.

BRIEF DESCRIPTION OF THE DRAWINGS

The present invention is described in detail below with reference to the attached drawing figures, wherein.

DETAILED DESCRIPTION

Figure 1:
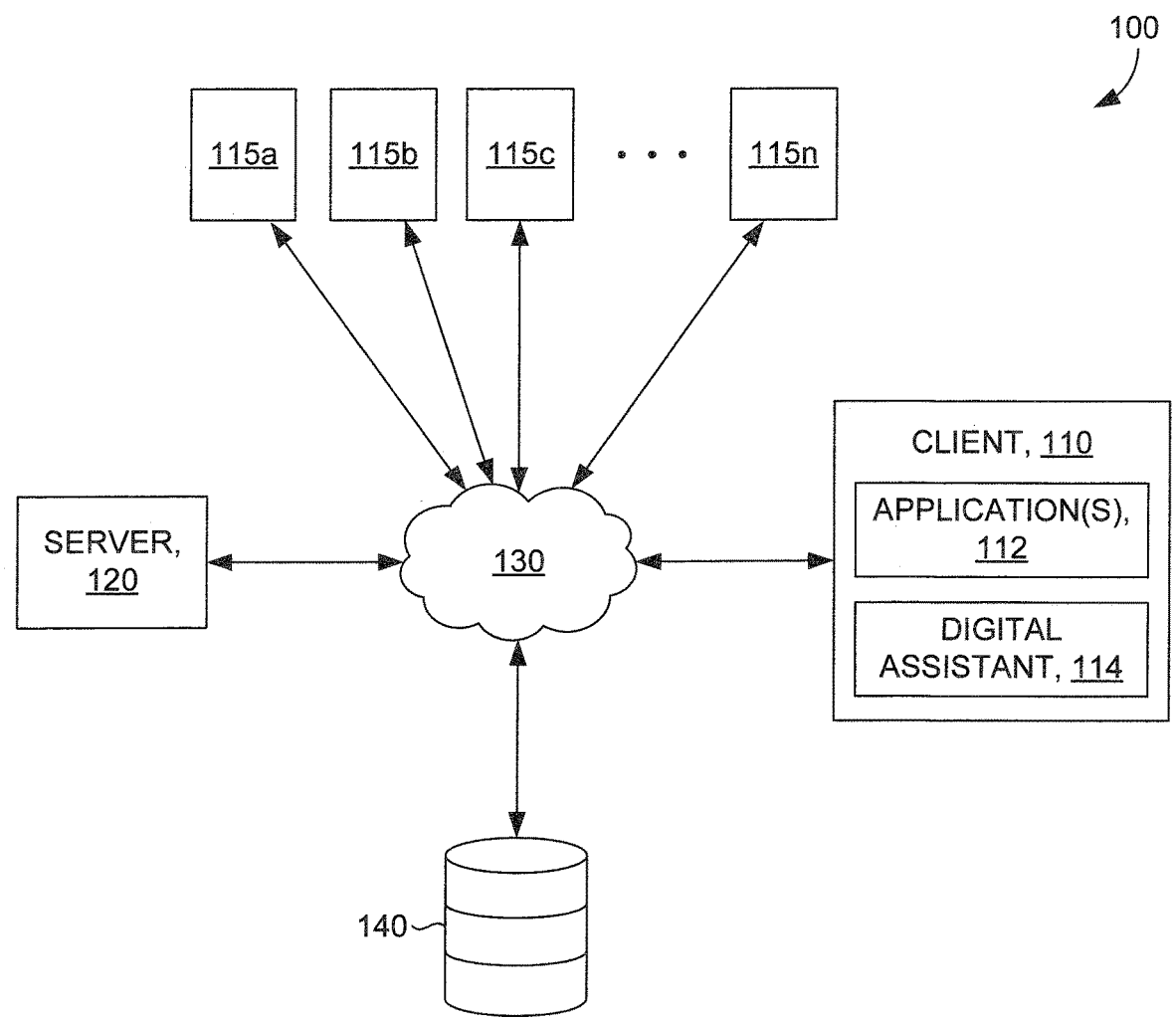
FIG. 1 depicts an exemplary operating environment in accordance with some embodiments of the present disclosure.

The subject matter of aspects of the present disclosure is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

As electronic devices become more integrated into our daily lives, so do the methods in which we can interface with them. Digital assistants have found a place in many peoples' homes, providing voice-activated services that can assist users with various tasks, from a basic level to a very advanced level. However, conventional digital assistants are mostly limited to the capabilities that the service provider and their developers implement. Some service providers and developers provide an open interface (e.g., an API) such that third-parties can develop custom services that can essentially "plug in" to the digital assistant and provide additional services. Typically, these digital assistants are implemented into a stationary device or mobile phone, and activated by speech detection or manual activation (e.g., a button press). Once activated, the digital assists receive a voice command, and relay the command to a remote server of the service provider (or third-party service provider) for processing. The remote server can then provide a response or an acknowledgement of the received command to the digital assistant for output to the user.

For the most part, modern-day society has adopted the use of mobile computing devices, such as smart phones, tablets or other devices such as watches and connected glasses. Users generally prefer to carry portable computing with them, having a readily-available resource for accessing information and providing a means for communication. Users can download and install mobile applications of their choosing, and maintain settings that are customized to their personal preferences. The number of applications providing unique services to users is astounding, increasing by the thousands daily. In this regard, it is improbable to provide digital assistant services that can cater to the needs of all users, particularly based on the various services provided by the applications preferred and utilized by the users. Further, with the mass proliferation of network connected to IoT devices that are controlled by mobile applications, it is important for digital assistants to be able to control actions in these applications.

As such, a digital assistant having easily customizable commands and actions that can be performed by the digital assistant, based on the receipt of a command, solves the aforementioned problems. As briefly noted above, the "Q" digital assistant, developed by Aiqudo, Inc., headquartered in San Jose, Calif., has implemented customizable automation into the digital assistant. In other words, the "Q" digital assistant can, among many other things, perform a series of predefined tasks (e.g., "action") based on the receipt of a predefined input (e.g., "command") to accomplish a desired result. In addition, the "Q" digital assistant provides a plethora of additional services, such as crowd-sourced definitions of various commands and actions (e.g., talk back feature) that are quality-assured by intelligent algorithms, essentially eliminating the need for a novice user to "train" their digital assistant to work with their preferred applications.

Among other things, the "Q" digital assistant receives a voice command and translates the speech to text. The digital assistant can then employ natural language processing to analyze the text for any recognized commands that may be serviced by applications already-installed or required-to-be-installed by the user. In some instances, the commands may include parameters that are recognized by the digital assistant as well. Provided that an application capable to service the command is installed on the user device, the "Q" assistant can then automate a series of predefined tasks, which can include, by way of example only: launching the application, emulating touch inputs for button presses or application navigation, passing parameters into application form fields, waiting for application or remotely-communicated responses, and many more, until the automated "action" is fully executed and the user is provided with a verbal result of the provided command.

As described, when the automated action is being executed by the digital assistant, or in other words when the various steps associated with an automated action are being performed, the various steps required to complete the action are emulated by the digital assistant. In essence, and by way of example only, the user can provide a voice command to the digital assistant, such as "how much is a hotel room tonight," the digital assistant can determine that a particular application can provide this service, determine a current location of the user and the nearest hotel, and launch a hotel booking application that the digital assistant can pass the "current location" and "date" parameters to. Any additional inputs, such as a "hotel name," "specific location," "room options," or a "submit" button can also be provided by or automated by the digital assistant provided that such options or tasks are included in the predefined action corresponding to the received command. Accordingly, the digital assistant can verbally communicate the output (i.e., price of the hotel room) to the user in accordance with the parameters communicated along with the command. In this way, the user does not have to interact directly with the user interface of the application or even the application itself.

In some embodiments, context or additional options may be verbally communicated to the user. For example, the output may be associated with metadata. Continuing the above example, in addition to providing output specific to the command, such as the price of the hotel room, the hotel booking application may indicate that only one room is still available. As will be explained in additional detail below, the metadata may be automatically added as context to the output by the digital assistant or may be manually added by a user customizing the command and action. Additionally, the command and action may only be part of the workflow. In this way, the digital assistant may verbally communicate the output (e.g., price of the hotel room), ask the user if the user would like to book the hotel room, and based on the response verbally communicated by the user, provide confirmation of the booking or the decision not to book the hotel room.

In some embodiments, the output may be provided to another device for verbal communication to the user. For example, the user may not be in proximity to the mobile device that has a particular application the user would like to access. However, the user may be in proximity to another device with a digital assistant (e.g., a digital assistant controlled speaker). In this case, a command may be communicated by the user to the other device. The other device communicates the command to a server where it is communicated to the mobile device with the particular application. The command may then be executed on the mobile device and the output is communicated back to the server where it is communicated to the other device. Accordingly, the digital assistant on the other device can verbally communicate the output to the user in accordance with the parameters communicated along with the command. In this way, the user does not even have to interact directly with the mobile device having the application installed.

Turning now to FIG. 1, a schematic depiction is provided illustrating an exemplary system 100 in which some embodiments of the present invention may be employed. It should be understood that this and other arrangements described herein are set forth only as examples. Other arrangements and elements (e.g., machines, interfaces, functions, orders, groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The system in FIG. 1 includes one or more clients 110, 115a, 115b, 115c, . . . 115n, in communication with a server 120 via a network 130 (e.g., the Internet). In this example, the server 120, also in communication with the network 130, is in communication with each of the client devices 110, 115a-115n, and can also be in communication with a database 140. The database can be directly coupled to the server 120 or coupled to the server 120 via the network 130. The client device 110, representative of client devices 115a-115n, is a computing device comprising one or more applications 112 and a digital assistant 114 installed thereon. The following description in reference to FIG. 1 provides a high level overview of the "Q" digital assistant, described briefly herein above, with additional detail provided in U.S. Provisional Application No. 62/508,181, filed May 18, 2017, entitled "SYSTEMS AND METHODS FOR CROWD-SOURCED ACTIONS AND COMMANDS," and U.S. Provisional Application No. 62/509,534, filed May 22, 2017, entitled "CONNECTING MULTIPLE MOBILE DEVICES TO A SMART HOME ASSISTANT ACCOUNT."

The one or more applications 112 includes any application that is executable on the client 110, and can include applications installed via an application marketplace, custom applications, web applications, side-loaded applications, applications included in the operating system of the client 110, or any other application that can be reasonably considered to fit the general definition of an application. On the other hand, the digital assistant 114 can be an application, a service accessible via an application installed on the client 110 or via the network 130, or implemented into a layer of an operating system of the client 110. In accordance with embodiments described herein, the digital assistant 114 provides an interface between a client 110 and a user (not shown), generally via a speech-based exchanged, although any other method of exchange between user and client 110 remains within the purview of the present disclosure.

When voice commands are received by the digital assistant 114, the digital assistant converts the speech command to text, analyzes the command to extract relevant keywords and/or parameters, processes the keywords and/or parameters and/or any additional contextual data obtained by the client 110, identifying the command in a library of recognized commands and corresponding actions, and determining an appropriate action to perform on one or more applications 112 installed on the client 110.

By way of brief overview, a command can include one or more keywords and/or one or more parameters and parameter types, generally corresponding to a predefined action to be performed on one or more particular applications. Moreover, a plurality of commands can correspond to a single predefined action, such that there are multiple equivalent commands that can invoke the same predefined action. By way of example only, commands such as "check in," check into flight," "please check in," "check into flight now," "check in to flight 12345," and the like, can all invoke the same action that directs the digital assistant to open up an appropriate application and perform the predefined set of tasks to achieve the same result.

The aforementioned commands, however, may lack appropriate information (e.g., the specific airline). As one of ordinary skill may appreciate, a user may have multiple applications from various vendors associated with a similar service (e.g., airlines). While not described in detail herein, the referenced "Q" digital assistant provides features that can determine contextual information associated with the user, based on historical use of the digital assistant, stored profile information, stored parameters from previous interactions or commands, searches through email folders, and a variety of other types of information stored locally or remotely on a server, such as server 120, to identify an appropriate parameter and determine a complete command to invoke the appropriate action. More specific commands, such as "check into FriendlyAirline flight," or "FriendlyAirline check in," and the like, can be recognized by a digital assistant, such as the "Q" assistant, to invoke the appropriate action based on the complete command received thereby.

One or more recognizable commands and corresponding actions can be received by the digital assistant 114 from the server 120 at any time, including upon installation, initialization, or invocation of the digital assistant 114, after or upon receipt of the speech command by the digital assistant 114, after or upon installation of a new application, periodically (e.g., once a day), when pushed to the client 110 from the server 120, among many other configurations. It is contemplated that the commands and corresponding actions received by the client 110 are limited based at least in part on the applications 112 installed on the client 110, although configurations where a larger or smaller set of commands and actions can be received.

In the event a command and/or action is not available for a particular application installed on the client 110, digital assistant 114 can either redirect the user to a marketplace to install the appropriate application, or include a training feature that enables a user to manually perform tasks on one or more applications to achieve the desired result. The digital assistant 114 can also receive one or more commands from the user (e.g., via speech) to associate with the tasks manually performed or to be manually performed during training. In this way, the command is associated with at least the particular application designated by the user and also corresponds to the one or more tasks manually performed by the user, associating the received command to the task(s) and the desired result. In some instances, the server 120 can provide a command and/or action for the received command based on crowd-sourced commands and/or actions collected (e.g., submitted by or received from) client devices 115a-115n also independently having a digital assistant 114 and applications 112 installed thereon. The client devices 115a-115n may have any combination of applications 112 installed thereon, and any training of commands and actions performed on any client device 110, 115-115n can be communicated to the server 120 to be analyzed and stored for mass or selective deployment. Although not described in more detail herein, the server 120 can include various machine-learned algorithms to provide a level of quality assurance on user-trained commands and actions before they are distributed to other users via the network 130.

When the digital assistant 114 determines an appropriate action (e.g., one or more tasks to achieve a desired result) that corresponds to the received command, the digital assistant 114 performs the automated tasks and an output of the application(s) 112 may be generated by the application(s) 112 and communicated verbally to the user by the digital assistant 114, another digital assistant running on the client 110 or another device, or communicated textually or in another format to the same or another application for further action.

Figure 2:
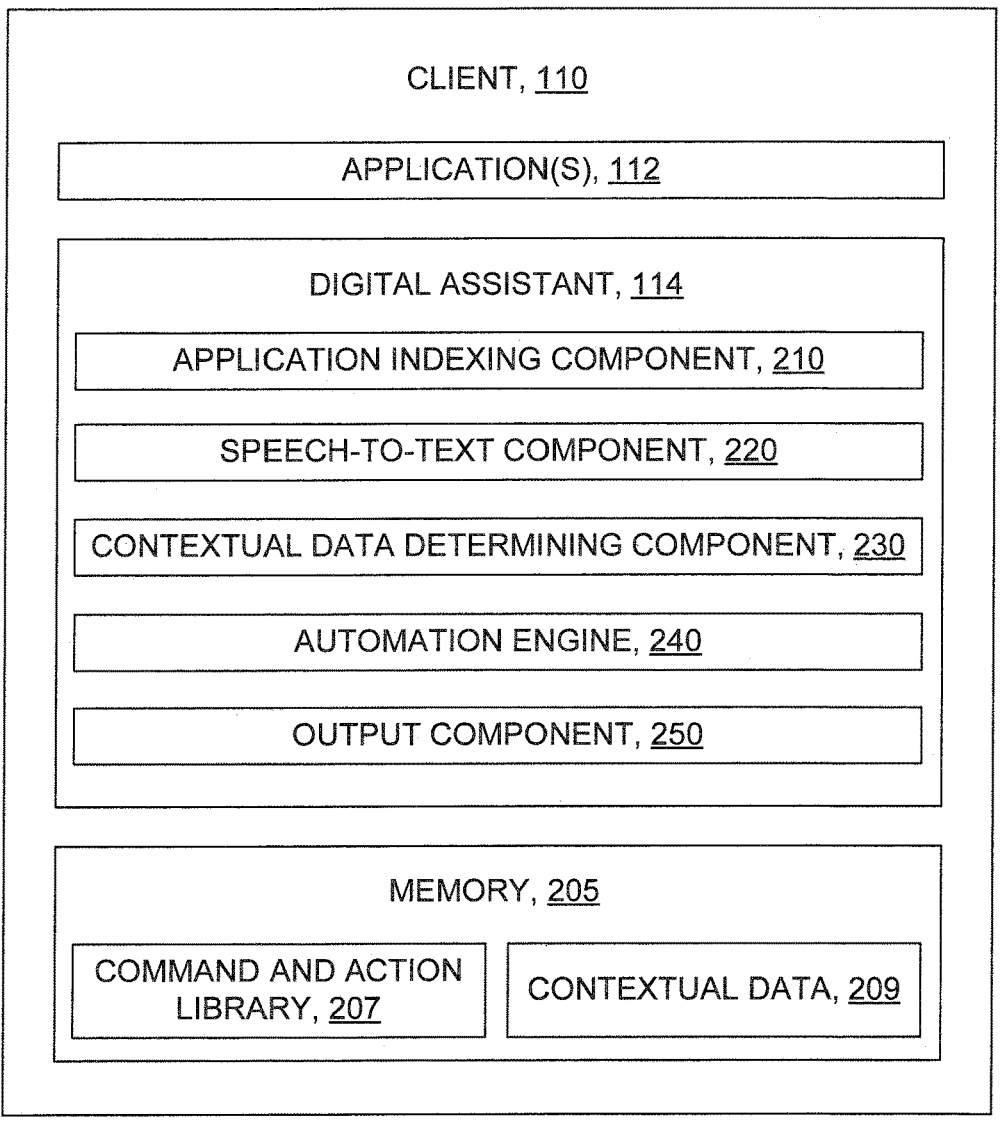
FIG. 2 is a block diagram illustrating an exemplary implementation of a client having a digital assistant in accordance with some embodiments of the present disclosure.

Referring now to FIG. 2, a block diagram 200 is provided to illustrate an exemplary implementation of a client 110 having one or more applications 112 installed thereon and a digital assistant 114 in accordance with some embodiments of the present disclosure. As noted herein, the client 110 can include a memory 205 for storing, among other things, a command and action library 207 and contextual data 209 associated with the client 110 or application(s) 112 and/or a profile associated with the client 110.

The command and action library 207 can include, among other things, a dataset of recognizable commands and corresponding actions. The commands and actions stored in the library 207 may be limited to the applications currently installed on the client 110, or may include a collection of commonly used (e.g., popular) applications installed by a larger population of clients, such as clients 115a-115n of FIG. 1. In some aspects, the commands and actions can be further limited based on versions of the application or the platform (e.g., operating system) on which the applications are executed. While storage of a larger dataset of recognizable commands and corresponding actions is preferable for offline availability of the digital assistant, in some instances the command and action library 207 can only include a single command or a small set of commands and corresponding action(s) retrieved from a server, such as server 120, based on the command(s) recently received by the digital assistant 114.

The contextual data 209 can include a variety of information including device information, application information, profile information, and historical information. The device information can include current device location data (e.g., GPS coordinates), surrounding signal data (e.g., recognized wireless signals, Bluetooth, cellular, NFC, RFID, Wi-Fi, etc.), among other things. The application information can include common phrases corresponding to outputs of the application(s) (i.e., incorporation of the output in a complete sentence or phrase as might be commonly spoken), entities corresponding to the outputs of the application(s) (e.g., name, brand, location, price, etc.), and/or units of measurement of the outputs. The profile information can include user demographic information (e.g., gender, location, income, occupation, etc.), personal preferences (e.g., foods, entertainment, sports teams, etc.), relationships (e.g., other users also having digital assistant 114 on their respective computing devices, social network connections, etc.), calendar information (e.g., appointments, times, locations, attendees, etc.), and the like. Historical information can include commands or portions thereof previously provided to and/or recognized by the digital assistant 114, device information history, profile information history, among other things. The stored command and action library 207 and contextual data 209 stored in memory 205 can provide the digital assistant 114 with information that can be analyzed and employed to provide relevant and useful information to a client 110 user when automated actions are being performed.

To implement various embodiments described herein, the digital assistant 112 can include, among other things, an application indexing component 210, a speech-to-text component 220, a contextual data determining component 230, an automation engine 240, and an output component 250. The described components are not intended to be limited to the specific structure, order, or devices described herein, and can be implemented in such ways where operations described therein can be swapped, intermixed, or modified to achieve the same or similar results described within the purview of the present disclosure.

The application indexing component 210 of the digital assistant 114 can scan an index of applications installed on the client 110 to identify a set or "index" of applications particular to the client 110. In this way, in accordance with some embodiments, the digital assistant 114 can employ the data obtained by application indexing component 210 and determine the specific set of commands available to the user for the applications currently installed on the client 110. This information can be employed by the digital assistant 114, for instance via output component 250, to identify relevant suggestions for communicating output from applications currently installed on the client 110. Embodiments are not necessarily limited to the foregoing, and other embodiments consider that the index of applications can be submitted to the server 120, stored in contextual data 209, or any combination thereof.

The speech-to-text component 220 of the digital assistant 114 can receive audio input data via, by way of example, a microphone coupled to the client 110. The audio data, including speech data, can then be processed by the digital assistant 114 and converted into a string of text. This string of text can include, among other things, keywords, parameters, fillers, or any other aspect of a spoken language that is relayed by a user to the digital assistant 114 via speech communication. It is contemplated that the spoken language is in any language in which the digital assistant 114 is capable of handling, which can be based on a command and action library 207 including commands in the spoken language, or a translation engine that can be employed to translate the spoken language into a command that is then interpreted by the digital assistant 114 in the native language of the predefined commands or translate an output into a spoken language of the user.

The contextual data determining component 230 can, among other things, retrieve contextual data 209 from one or more components of or in communication with the client 110, including the application(s) 112. In addition, the contextual data determining component 230 can facilitate the interpretation or completion of the string of text generated by the speech-to-text component 220 or the interpretation or completion of the output generated by the output component 250. As described, the speech-to-text component 220 merely generates a converted string of text from received speech data while the output component 250 generates converted speech data from talk back objects selected from a view of an application at a specific state (which may include text).

In some embodiments, the contextual data determining component 230 can employ the contextual data 209 stored in memory 205 to facilitate the generation or completion of an appropriate command recognizable by the client 110 (e.g., mapped to an installed application based on application indexing component 210, or available in command and action library 207) or to facilitate the generation or completion of an appropriate phrase or sentence corresponding to an output of an application(s) 112. The client 110 may itself, or employing server 120 via remote communications, employ machine-learned models to either replace the string of text generated by speech-to-text component 220 or complete the string of text to provide a recognizable command to the digital assistant 114 based on equivalencies determined via the machine-learned model. Similarly, the client 110 may itself, or employing server 120 via remote communications, employ machine-learned models to either replace the output of an application(s) 112 or complete a phrase or sentence corresponding to the output of an application(s) 112 to provide a recognizable response to the user in response to the command (which as described herein may be based in part on context corresponding to the output of the application(s) 112 and stored as contextual data 209).

The automation engine 240 can perform a series of steps or "tasks" defined in an action that corresponds to the received command. Each task can be performed automatically by the digital assistant 114 by emulating button presses, pauses, responsive inputs, conditional inputs, or other inputs typically provided by a user, accessing application deep links or URLs that can invoke specific operations of one or more applications, and other operations that are necessary to achieve the desired result of performing all tasks associated with an action.

Figure 3:
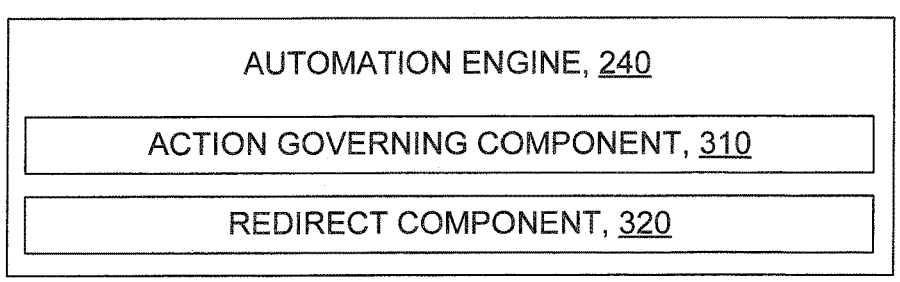
FIG. 3 is a block diagram illustrating an exemplary implementation of an automation engine in accordance with some embodiments of the present disclosure.

With reference now to FIG. 3, the automation engine 240 can include, among other things, an action governing component 310 and a redirect component 320. In various embodiments, the action governing component 310 can determine when to initiate a selected action (e.g., based on a determination that the command is defined in the command and action library 207), determine when various operations or tasks of an action are completed so that subsequent operations or tasks of the action can be initiated, (e.g., based on expected GUI events generated by an application), and determine when an action is fully completed (e.g., also based on expected GUI events or after completion of the final task (i.e., the talk back output)) to provide a result or confirmation to the user that the desired action was successfully executed. Further, a specific element can be identified to be used as a talk back object to be retrieved and conveyed back to the user upon completion of the task. In some instances, the action governing component 310 can terminate a task based on a received command. The redirect component 320 facilitates communications between the output component 250 and another digital assistant running on the client 110, another device, or another application(s) 112. In this way, the output can be redirected such that a different digital assistant verbally communicates the output to the user or a digital assistant running on a different device verbally communicates the output to the user. In some embodiments, the output may be redirected to a different application running on the client 110 or a different device.

Looking now to FIGS. 4-10, illustrations are provided to depict an exemplary workflow for setting up talk back automation for an output corresponding to an application in accordance with various embodiments of the present disclosure. The following steps can be facilitated by digital assistant such as digital assistant 114, having an automation engine such as automation engine 240 of FIGS. 2 and 3. The following description is merely exemplary and is not intended to be limiting in any way. Features and illustrations depicted in the figures are only provided to show an exemplary implementation, and are not to limit the sequence of events or layout of the graphical user interface. The illustrations of FIGS. 4-10 are provided herein to provide a clear depiction of a sequence of events in talk back automation.

Figure 4:
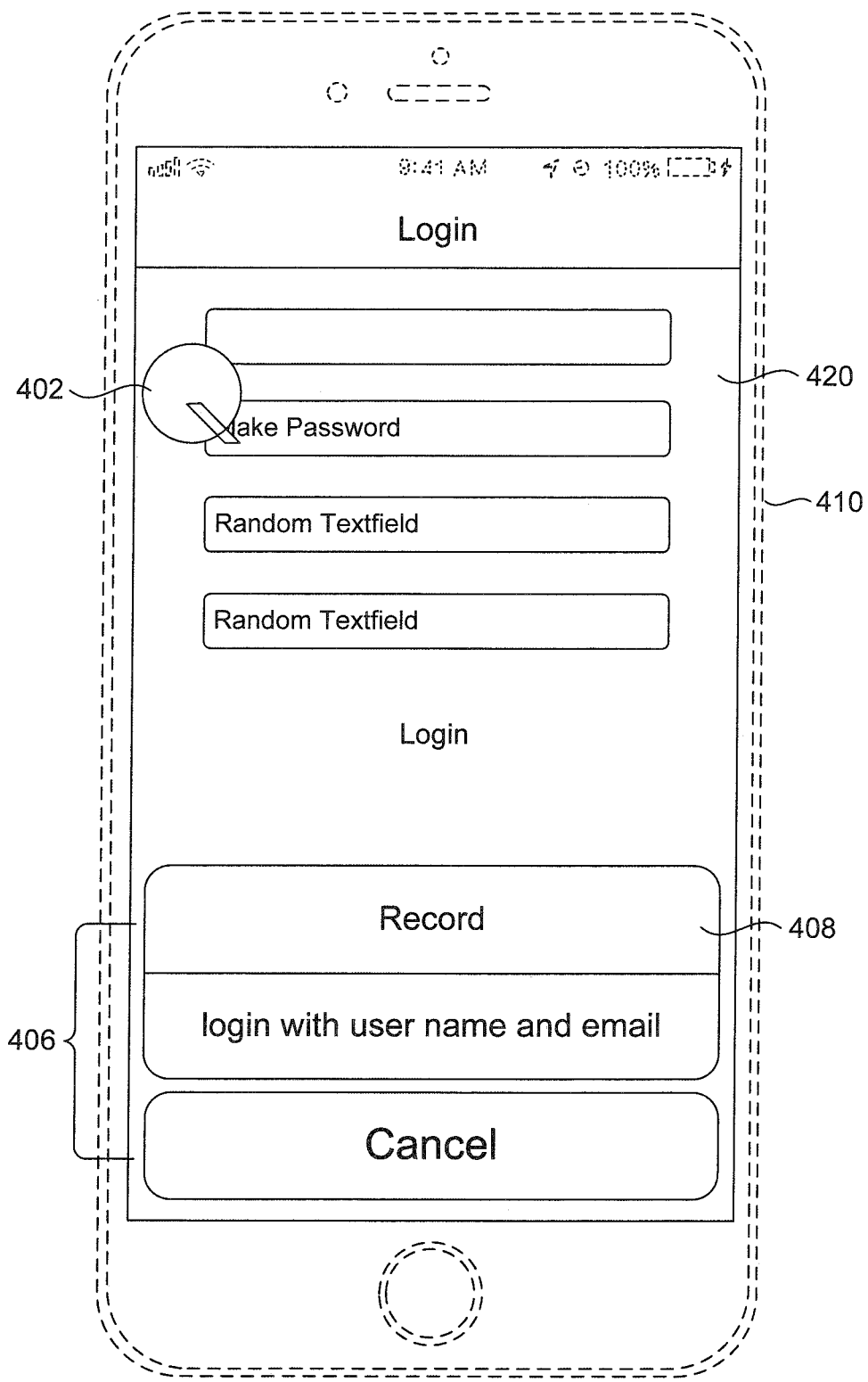
FIGS. 4-11 are illustrations depicting an exemplary workflow for setting up talk back automation for an output corresponding to an application in accordance with various embodiments of the present disclosure.

With reference to FIG. 4, illustrating a first step of the talk back automation process, a computing device 410 is provided having a display 420. On the display 420 is an indicator 402 that the talk back feature for the digital assistant (e.g., digital assistant 114) has been activated. It is contemplated that the talk back feature setup can be activated by a voice prompt (e.g., "talk back"), a physical input (e.g., a long button press), gesture, or the like. Talk back options 406 depicts an option to edit talk back features that have already been added by the user, an option to record a new talk back feature, or cancel out of the options and close the talk back feature setup. Upon selecting the record option 408, the user is able to navigate through the flow of an application to a desired state.

Figure 5:
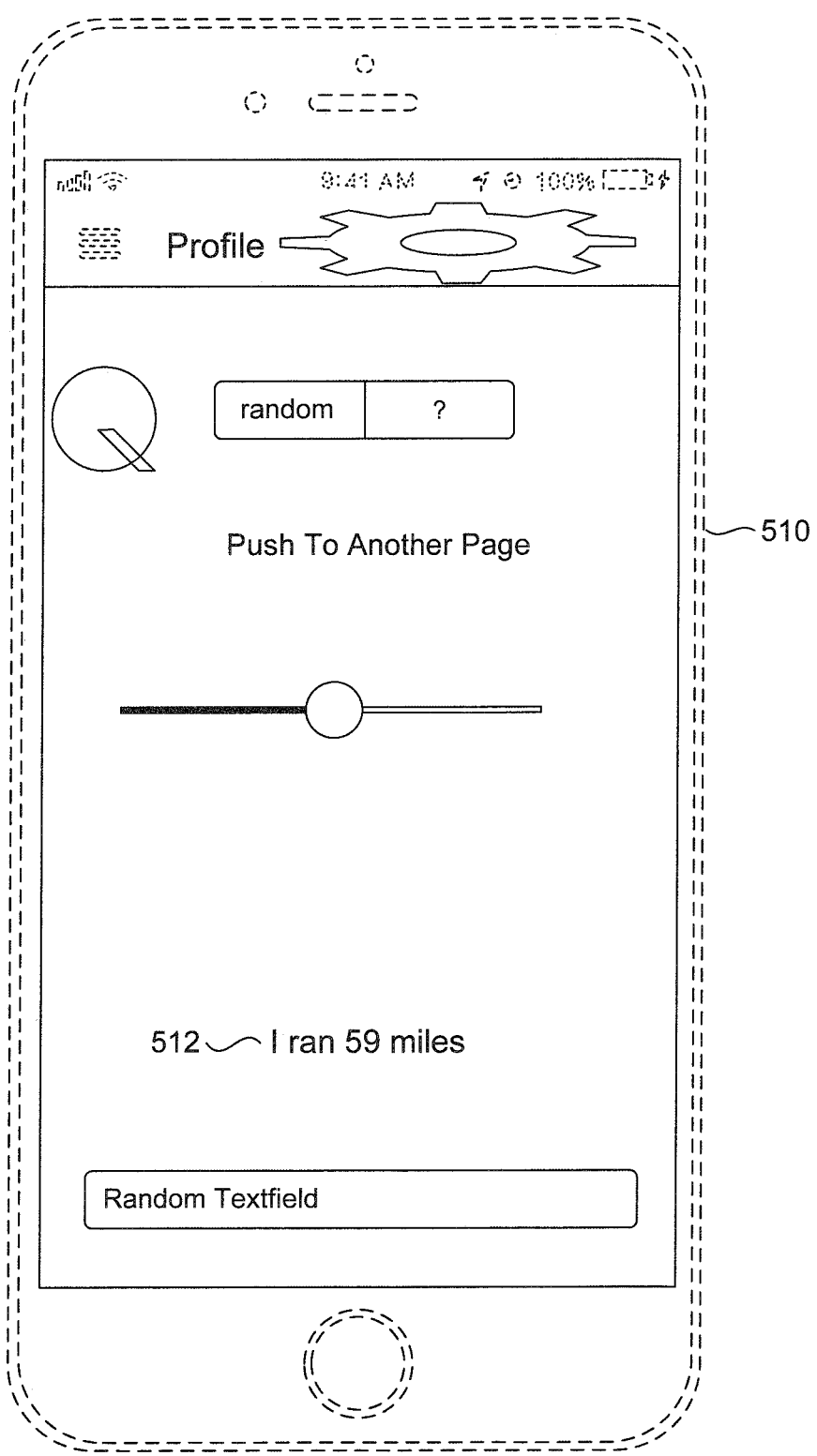

Moving on to FIG. 5, illustrating a second step of the talk back automation process, a home screen or "app" selection screen of the computing device 510 may be presented in response selecting the record option 408. In other words, once the record option 408 has been selected, the user selects the appropriate application for the desired talk back feature. As noted the illustration is merely exemplary, and it is contemplated that an application can be activated in any number of ways, including emulated navigation and touches, deep links, API calls, and the like. In FIG. 5, the user has selected a simple application that tracks the distance a user runs as indicated by the text "I ran 59 miles" 512.

Figure 6:
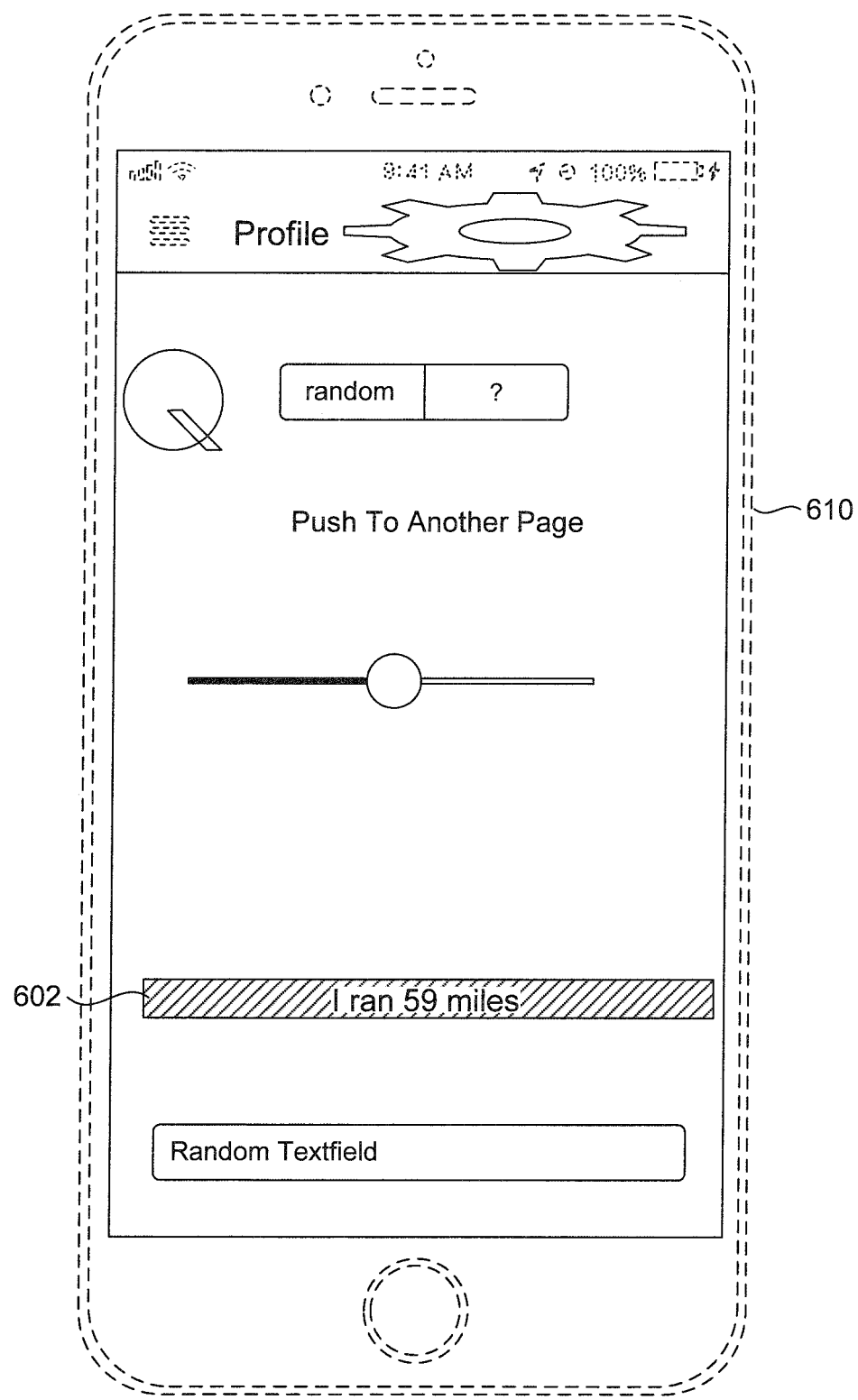

Moving now to FIG. 6, illustrating a third step of the talk back automation process, a view of the application at a specific state 610 is provided in response to the selection of and navigation of the application by the user. Here, the specific state identifies the distance a user runs. Although the specific state 610 as illustrated provides a simple display, it should be appreciated that any number of objects may be presented within the view at the specific state. The user may identify the talk back object (i.e., the desired output selected from the objects) 602 such as by highlighting the talk back object 602 and a command that is not otherwise defined by the application (e.g., a long button press). Once the talk back object 602 has been selected, the digital assistant may determine an entity corresponding to the talk back object 602.

Figure 7:
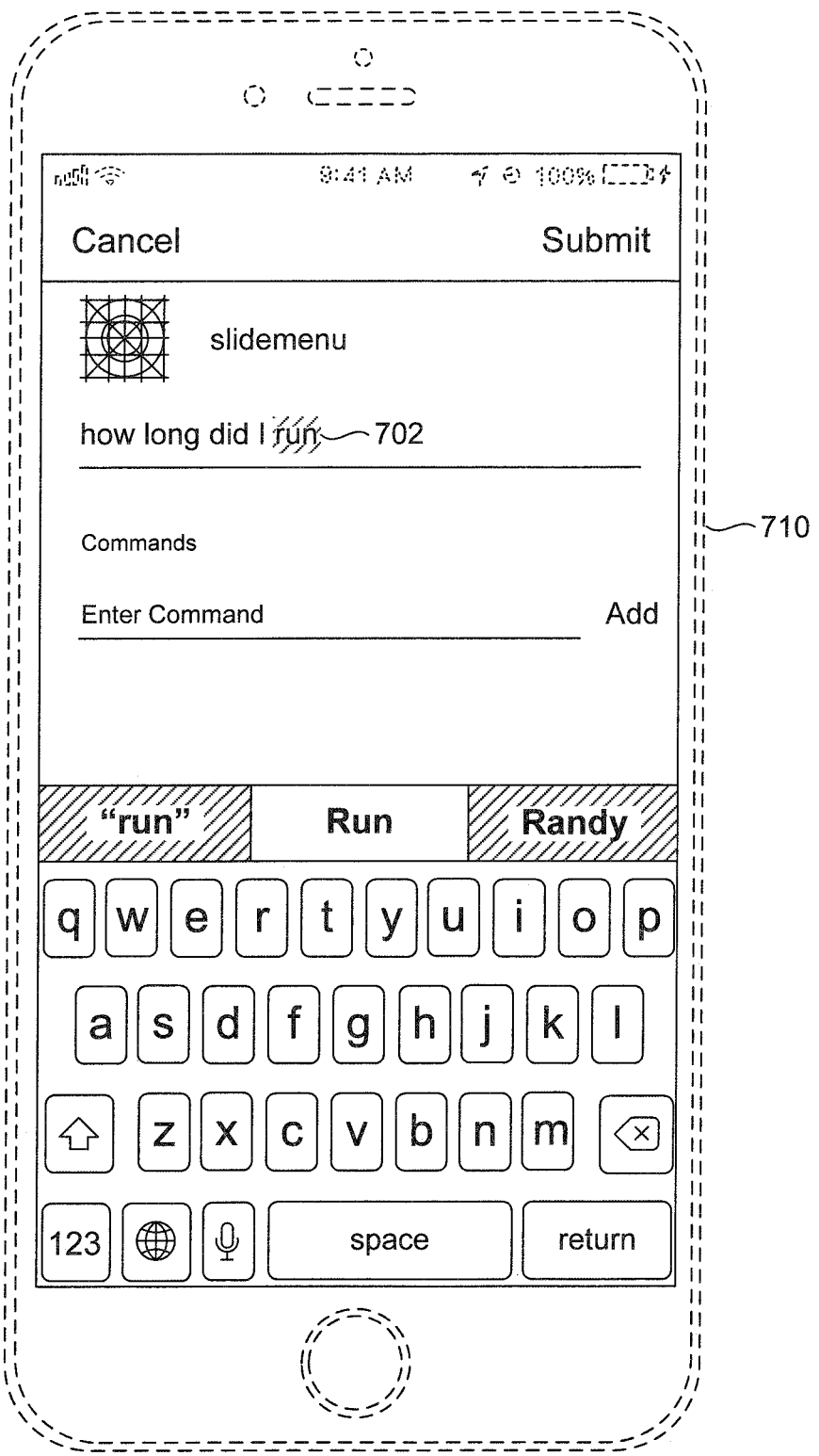

Looking now to FIG. 7, illustrating a fourth step of the talk back automation process, a command selection interface 710 is presented in response to the selected talk back object described in FIG. 6. As depicted, a user is prompted to enter a name for the talk back feature. Continuing the example of the simple application that tracks the distance a user runs, a user may name the talk back feature "how far did I run" 702.

Figure 8:
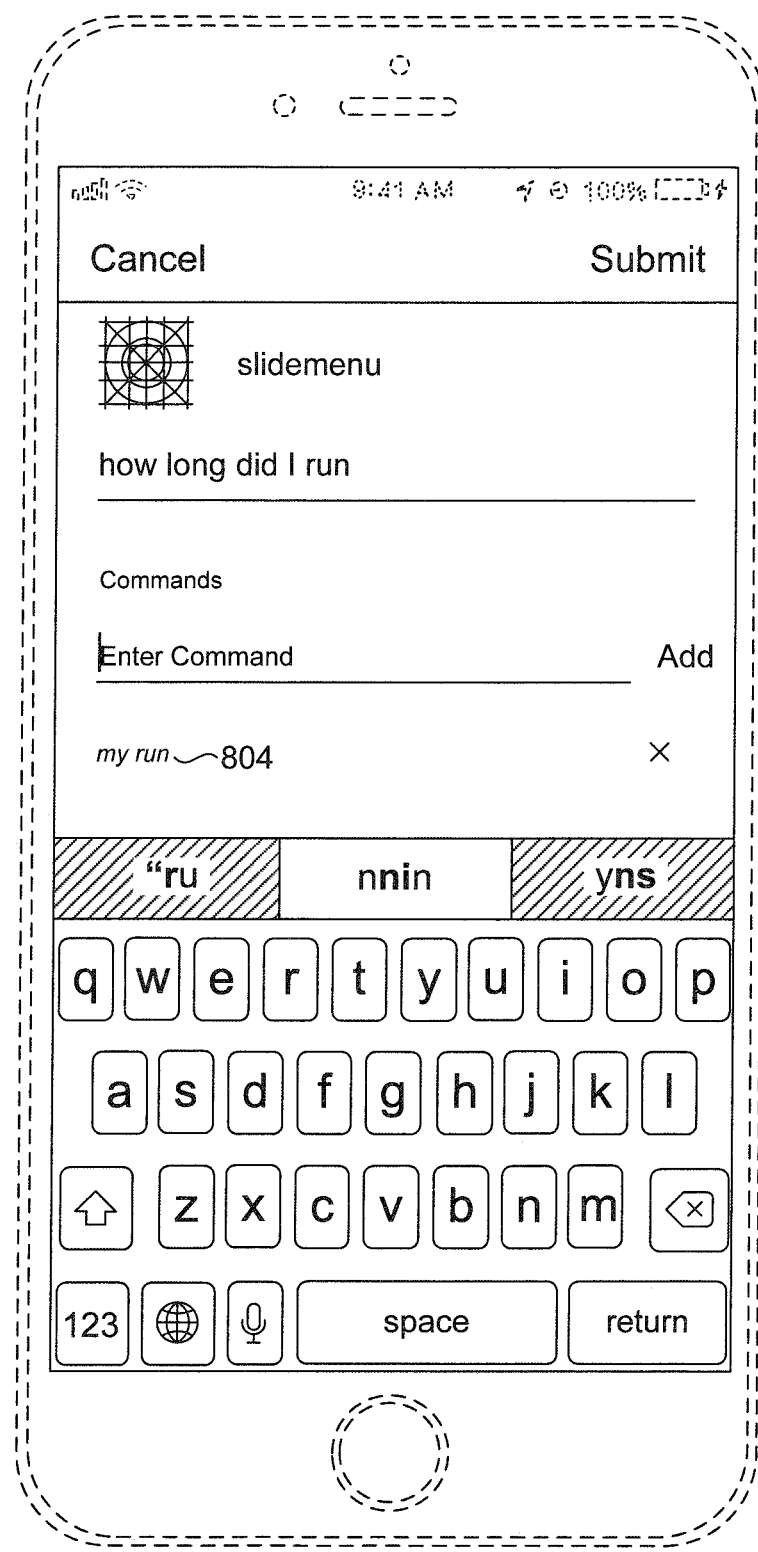
Figure 9:
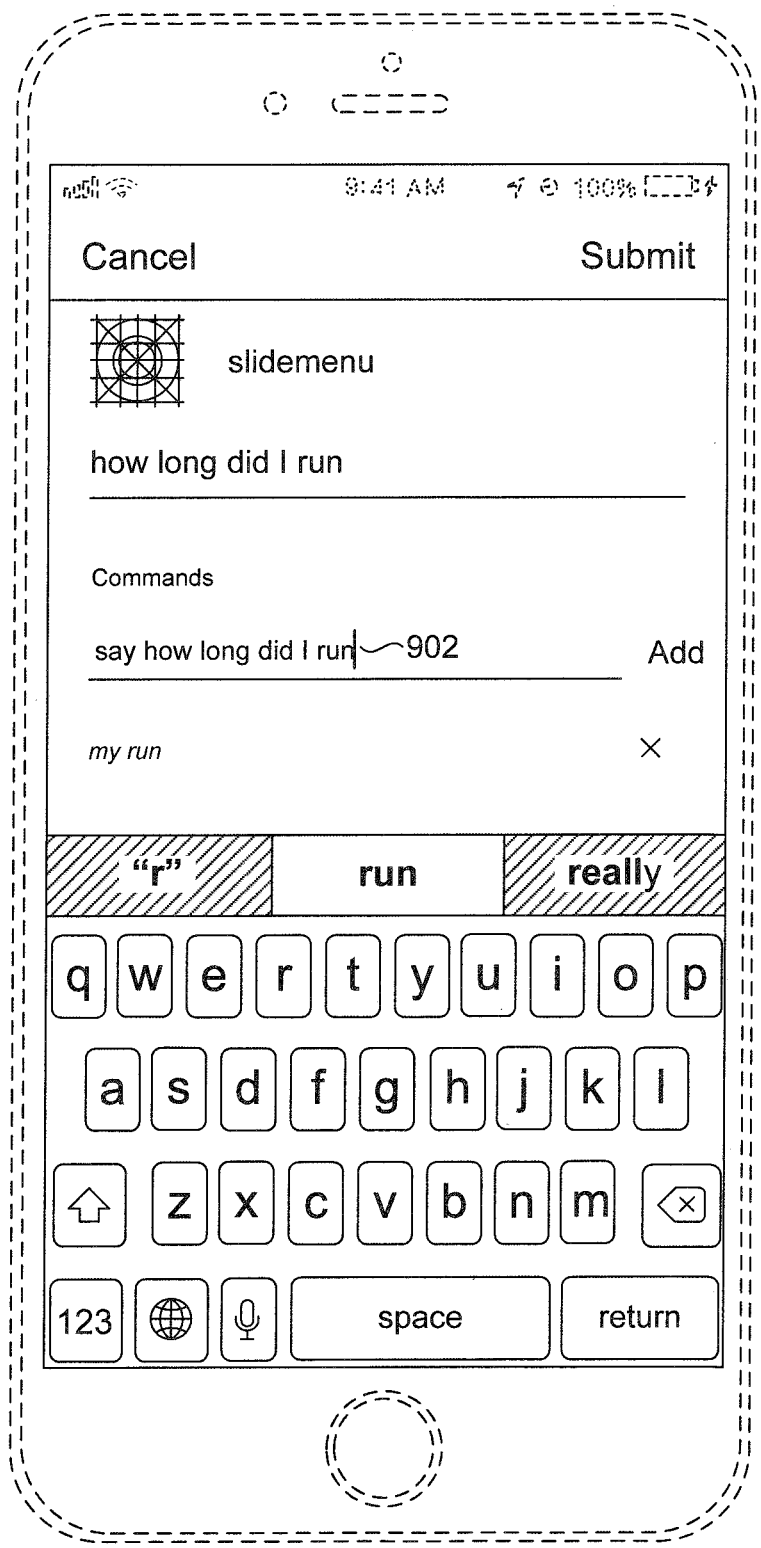
Figure 10:
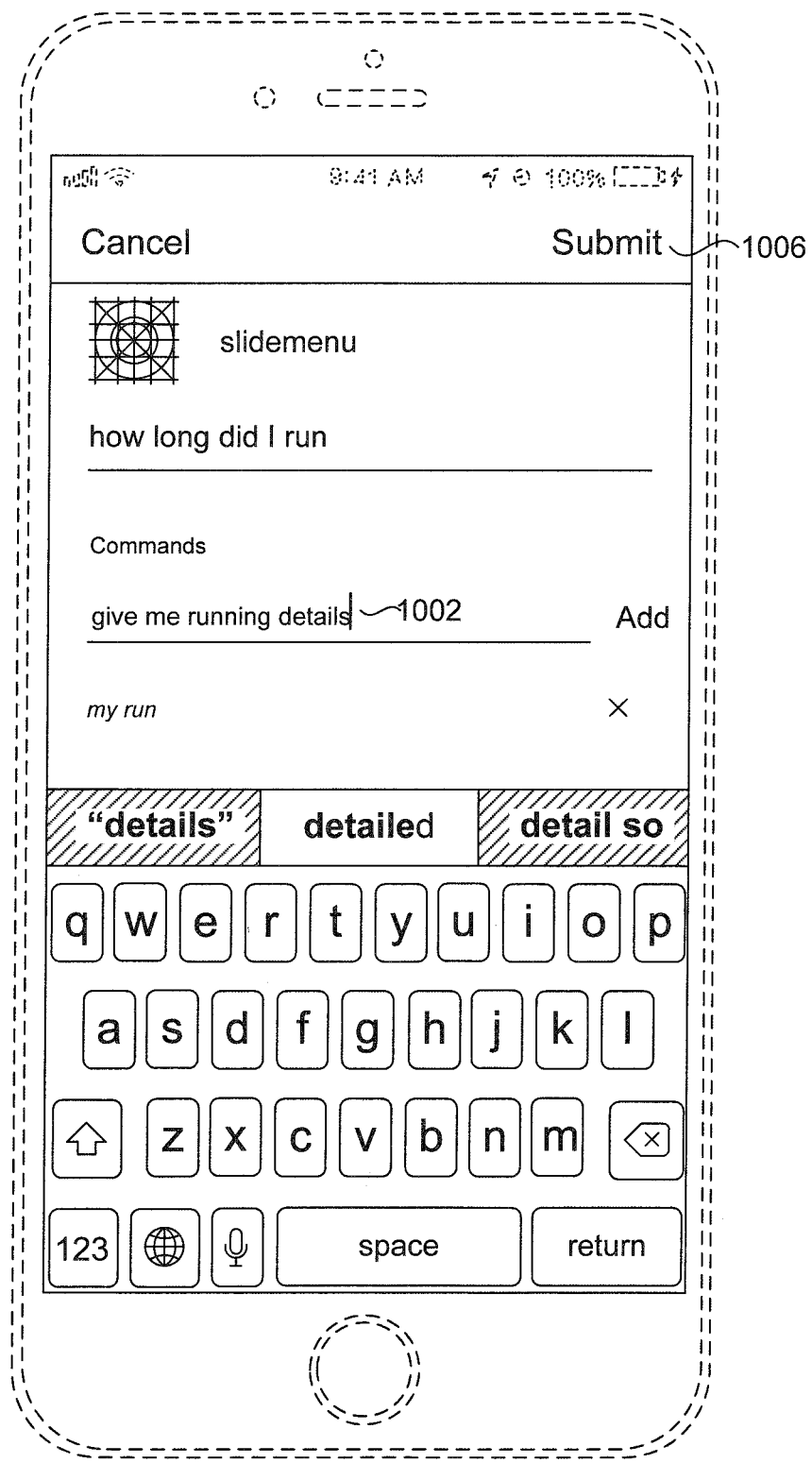

Upon naming the talk back feature, and referring now to FIGS. 8-10, the user is prompted to add various commands 802 that, when communicated to the digital assistant, activate the talk back feature. For example, a user may create a command that activates the talk back feature for the running application when the user speaks "my run" 804, "say how long did I run" 902, or "give me running details" 1002. Once the user has added all desired commands for the particular talk back feature, the user may select the submit button 1006 to save the talk back feature, which may be further stored at a server for use by other users.

Figure 11:
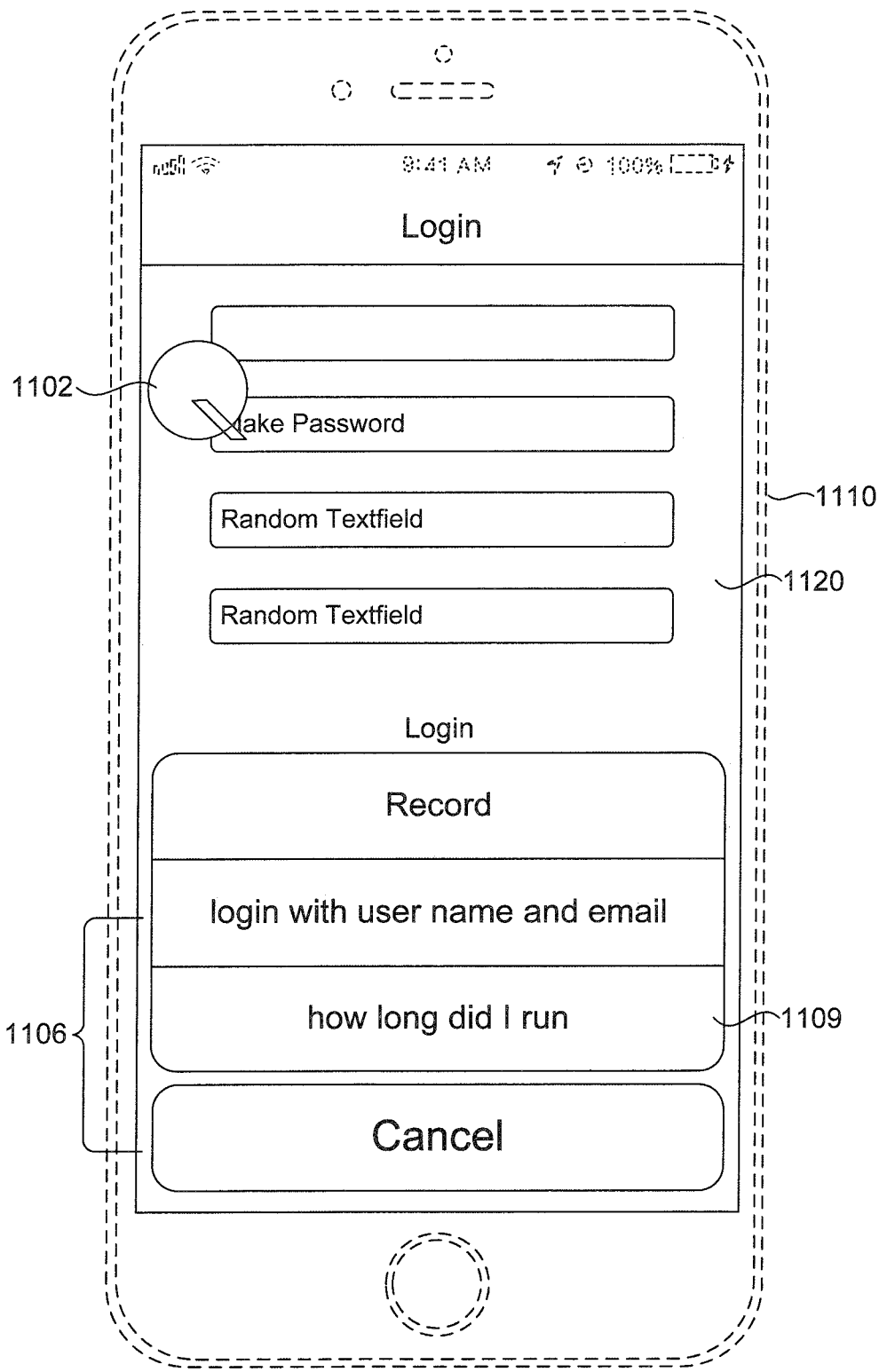

Turning now to FIG. 11, illustrating the first step of the talk back automation process again, a computing device 1110 is provided having a display 1120. Again, on the display 1120 is an indicator 1102 that the talk back feature for the digital assistant (e.g., digital assistant 114) has been activated. Now, talk back options 1106 depicts an option to edit talk back features, including the illustrated "how long did I run" talk back feature 1109, that have already been added by the user. Upon selecting the "how long did I run" talk back feature 1109, the user is able to make any changes to the talk back feature, as desired.

In various embodiments, the digital assistant 114 can determine additional context for the received command (for instance, by employing contextual data determining component 230) based on keywords and/or parameters parsed out of the command string generated by speech-to-text component 230 of FIG. 2. In further embodiments, the additional context can be determined based on contextual data 209 stored in memory 205. As described with regard to contextual data determining component 230, the determined additional context can provide clarifying or additional context to the digital assistant 114, such that a proper command is identified to determine a proper command to perform and/or an actual intent of the user.

In this regard, in one embodiment, a received command is recognized by the digital assistant 114, an analysis on the command and action library 207 can be performed by the digital assistant 114 to identify one or more additional commands (e.g., command suggestions) that are predefined and recognizable by the digital assistant 114. An additional command or "command suggestion" can be identified based on a determination by the digital assistant 114 that the additional command's corresponding action is performed on the same application(s) associated with the received command and talk back object, or a determination by the digital assistant 114 that the received command can also be invoked on different application(s) installed or available for installation on the client 110.

Additionally or alternatively, in various embodiments, the digital assistant 114 can determine additional context for the received talk back object (for instance, by employing contextual data determining component 230) based on metadata, keywords, and/or parameters parsed out of the identified objects in the view of the application at the specific state. In further embodiments, the additional context can be determined based on contextual data 209 stored in memory 205. As described with regard to contextual data determining component 230, the determined additional context can provide clarifying or additional context to the digital assistant 114, such that a proper talk back output is identified and communicated to the user or another application. For example, the additional context may indicate that a running application has been selected and a distance is the talk back object. Accordingly, the additional context may facilitate the output component 250 to verbally communicate to the user "You ran 59 miles today." Similarly, if the user has provided additional parameters in the command to ask how far the user ran last Tuesday, the additional context (indicating a distance ran last Tuesday, but indicated in a different language) may facilitate the output component 250 to verbally communicate to the user "You ran 59 miles last Tuesday" translated to the language of the user. In some embodiments, the additional context may facilitate the output component 250 to provide the talk back output in a format recognizable by the same or a different application as an input.

In this regard, in one embodiment, a received talk back object is recognized by the digital assistant 114, an analysis on the talk back object and corresponding metadata and action library 207 can be performed by the digital assistant 114 to identify one or more entities of the talk back object. The entities may be utilized to identify suggested sentences or phrases that are predefined and recognizable by the digital assistant 114 such that the talk back output can be communicated to the user in an understandable and meaningful manner. Moreover, any necessary translations or transformations of the talk back output may also be initiated based on such analysis, for example, the price of a product can be converted into the right currency based on the location of the user.

Figure 12:
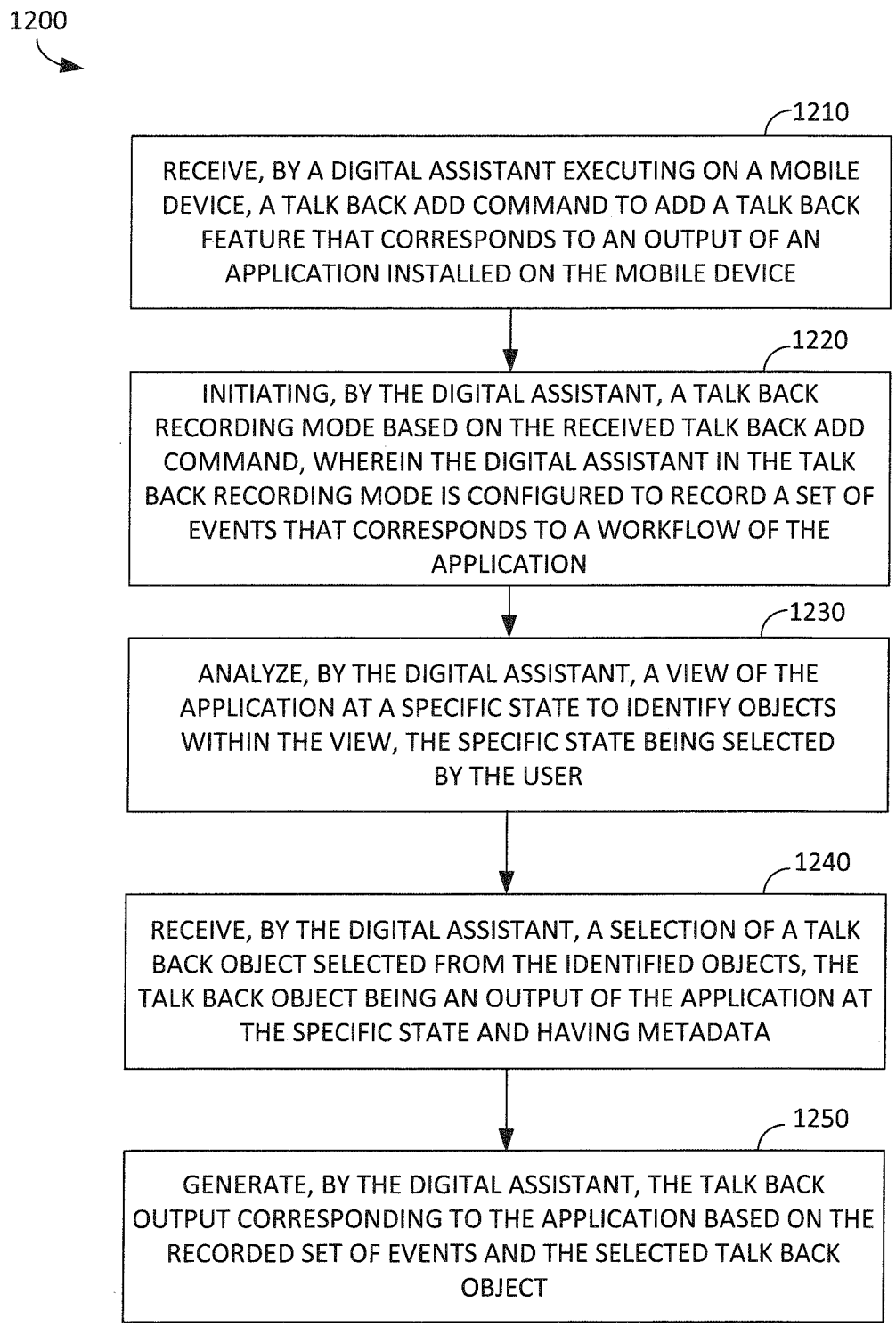
FIG. 12 is a flow diagram showing a method of providing talk back automation in accordance with some embodiments of the present disclosure.

Turning now to FIG. 12, a flow diagram 1200 is provided to illustrate a method of facilitating talk back automation. As shown at block 1210, a digital assistant, such as digital assistant 114 of FIGS. 1 and 2 executing on a client such as client 110 of FIGS. 1 and 2, receives a talk back add command to add a talk back feature that corresponds to an output of an application installed on the mobile device. In some embodiments, the talk back feature is embodied in a JSON data structure.

At block 1220, a talk back recording mode based on the received talk back add command is initiated by the digital assistant. In the talk back recording mode a set of events that corresponds to a workflow of the application is recorded.

At block 1230, a view of the application is analyzed, by the digital assistant, at a specific state to identify objects within the view. The specific state is selected by the user, such as by the user navigating to the specific state of the application in the talk back recording mode.

At block 1240, a selection of a talk back object selected from the identified objects is received by the digital assistant. The talk back object may be an output of the application at the specific state and may include metadata.

At block 1250, the digital assistant generates the talk back output corresponding to the application based on the recorded set of events and the selected talk back object. The talk back feature may be stored on a server, where access to the talk back feature is enabled for use by other users via digital assistants corresponding to the other users.

In embodiments, the digital assistant further receives one or more commands selected by a user. When the commands are communicated to the digital assistant by the user, the workflow of the application is initiated and the talk back output is provided to the user. The digital assistant may be configured to invoke a particular talk back feature responsive to a detected utterance that corresponds to a particular command of the one or more commands. In some embodiments, each command of the one or more commands includes a string representation of a detected audio input. In this way, each command of the one or more commands is generated by the mobile device employing a speech-to-text operation. Accordingly, the detected audio input may be a spoken utterance detected by the digital assistant via at least one microphone of the mobile device. In some embodiments, each command of the one or more commands includes at least one parameter to clarify what output should be provided by the application.

In various embodiments, the talk back output is provided to a device other than the mobile device, to the mobile device, or is communicated as an input to another or the same application.

In some embodiments, an entity type for the talk back object is determined. The entity type may be determined by the digital assistant based on the metadata (e.g., such as by employing machine learning to associate certain entity types with contents of the metadata and suggest the context to add to the talk back output). Additionally or alternatively, the digital assistant may provide suggestions to the user for selection of the appropriate entity type and/or context, e.g., recognized city, price information, zip code, etc. In other embodiments, a user may select the entity type. Context corresponding to the entity type may be added to the talk back output. For example, the metadata may provide details related to the output that might add clarification for the user. If the user asked how far was the longest run of the year for the user, the metadata might reveal a unit of measurement (e.g., miles), the day of the run (e.g., Saturday, Dec. 2, 2017), or even a starting and ending point, and detailed template as to how the talk back statement is constructed. As a result, the digital assistant may respond, "You ran 13.1 miles from your home to your office on Saturday, Dec. 2, 2017." It is possible to associate default behaviors and templates to specific entity types in the talk back object.

Figure 13:
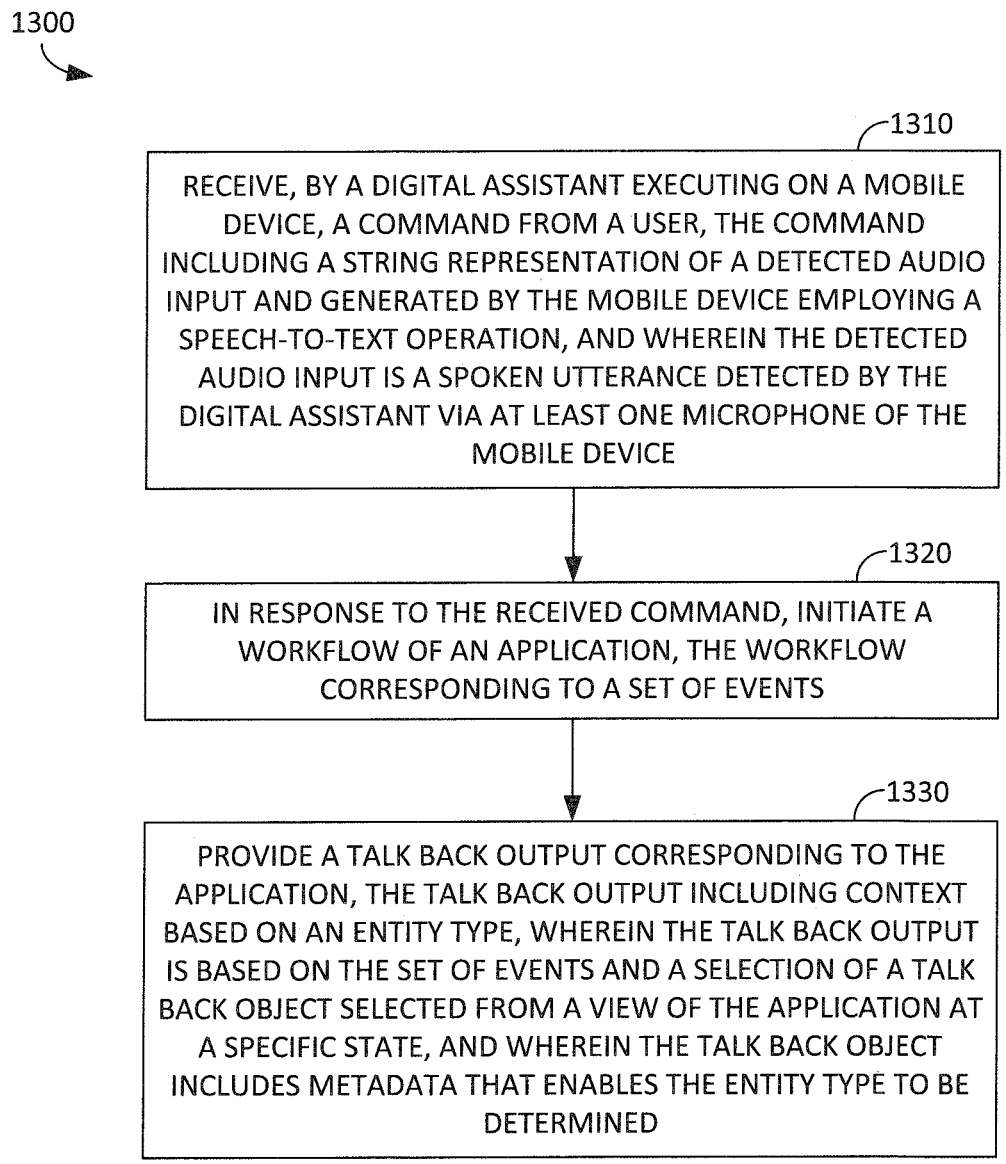
FIG. 13 is a flow diagram showing a method of providing talk back output in accordance with some embodiments of the present disclosure.

Referring now to FIG. 13, a flow diagram is provided that illustrates a method of providing talk back output. As shown at block 1310, a command from a user is received by a digital assistant. The command includes a string representation of a detected audio input and is generated by the mobile device employing a speech-to-text operation. The detected audio input is a spoken utterance detected by the digital assistant via at least one microphone of the mobile device.

At block 1320, in response to the received command, a workflow of an application is initiated. The workflow corresponds to a set of events.

At block 1330, a talk back output corresponding to the application is provided. The talk back output includes context based on an entity type. Additionally, the talk back output is based on the set of events and a selection of a talk back object selected from a view of the application at a specific state. The talk back object includes metadata that enables the entity type to be determined.

Figure 14:
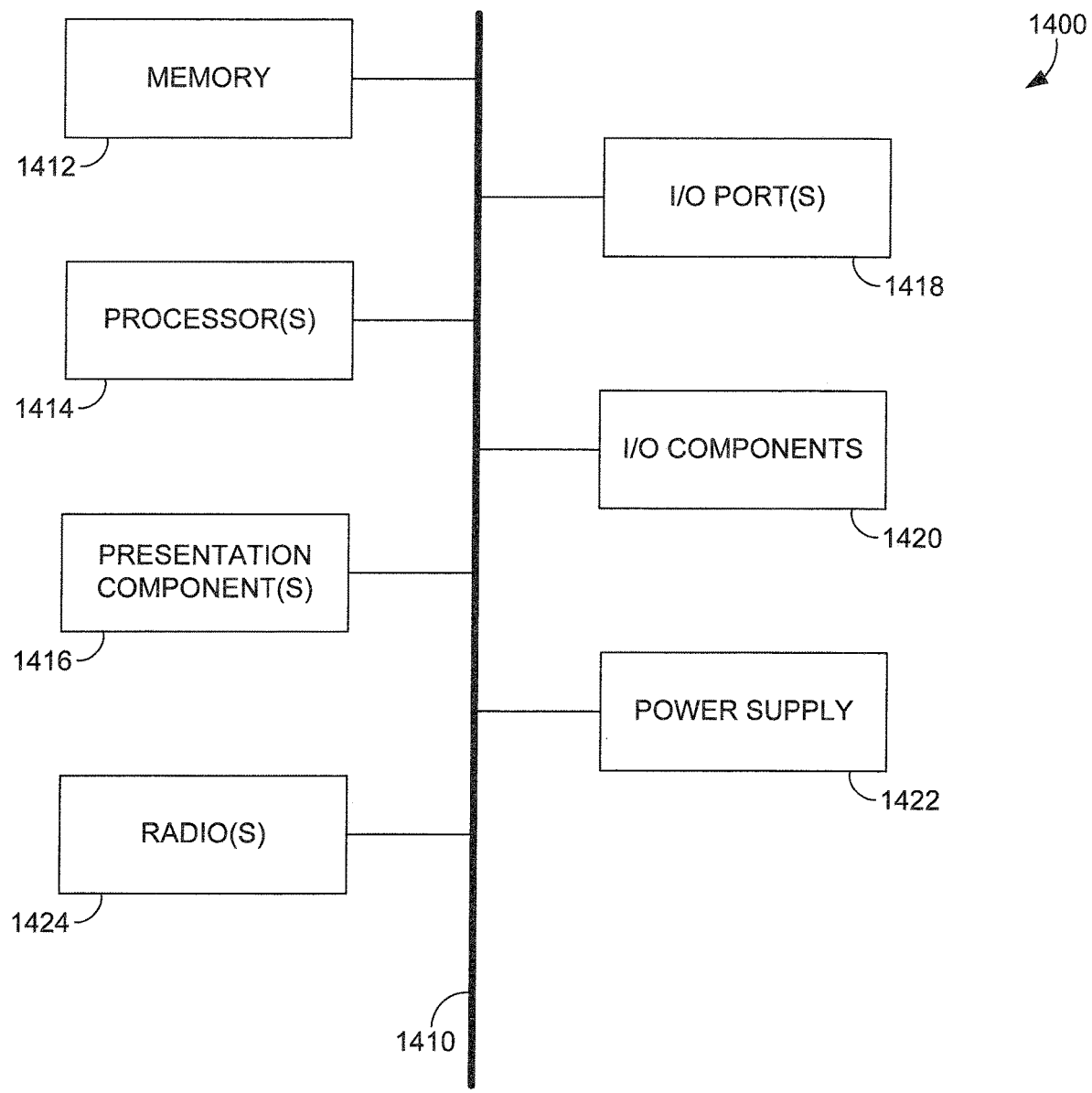
FIG. 14 is a block diagram of an exemplary computing environment suitable for use in implementing some embodiments of the present disclosure.

Having described embodiments of the present invention, an exemplary operating environment in which embodiments of the present invention may be implemented is described below in order to provide a general context for various aspects of the present invention. Referring initially to FIG. 14 in particular, an exemplary operating environment for implementing embodiments of the present invention is shown and designated generally as computing device 1400. Computing device 1400 is but one example of a suitable computing environment and is not intended to suggest any limitation as to the scope of use or functionality of the invention. Neither should the computing device 1400 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 14, computing device 1400 includes a bus 1410 that directly or indirectly couples the following devices: memory 1412, one or more processors 1414, one or more presentation components 1416, input/output (I/O) ports 1418, input/output components 1420, and an illustrative power supply 1422. Bus 1410 represents what may be one or more busses (such as an address bus, data bus, or combination thereof). Although the various blocks of FIG. 14 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventor recognizes that such is the nature of the art, and reiterates that the diagram of FIG. 14 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 14 and reference to "computing device."

Computing device 1400 typically includes a variety of computer-readable media. Computer-readable media can be any available media that can be accessed by computing device 1400 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 1400. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 1412 includes computer-storage media in the form of volatile and/or nonvolatile memory. The memory may be removable, non-removable, or a combination thereof. Exemplary hardware devices include solid-state memory, hard drives, optical-disc drives, etc. Computing device 1400 includes one or more processors that read data from various entities such as memory 1412 or I/O components 1420. Presentation component(s) 1416 present data indications to a user or other device. Exemplary presentation components include a display device, speaker, printing component, vibrating component, etc.

I/O ports 1418 allow computing device 1400 to be logically coupled to other devices including I/O components 1420, some of which may be built in. Illustrative components include a microphone, joystick, game pad, satellite dish, scanner, printer, wireless device, etc. The I/O components 1420 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 1400. The computing device 1400 may be equipped with depth cameras, such as stereoscopic camera systems, infrared camera systems, RGB camera systems, touchscreen technology, and combinations of these, for gesture detection and recognition. Additionally, the computing device 1400 may be equipped with accelerometers or gyroscopes that enable detection of motion. The output of the accelerometers or gyroscopes may be provided to the display of the computing device 1400 to render immersive augmented reality or virtual reality.

As can be understood, embodiments of the present invention provide for, among other things, optimizing display engagement in action automation. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A non-transitory computer storage medium storing computer-useable instructions that, when used by at least one computing device, cause the at least one computing device to perform operations to facilitate talk back automation, comprising:
   receiving, by a digital assistant executing on a mobile device, a verbal talk back add command to add a talk back feature that corresponds to an output of a target application installed on the mobile device, without the verbal talk back add command specifying the target application;
   storing the talk back feature on a server;
   initiating, by the digital assistant, a talk back recording mode based on the received verbal talk back add command, wherein the digital assistant in the talk back recording mode is configured to record a set of events that corresponds to a workflow of the target application;
   analyzing, by the digital assistant, a view of the target application at a specific state to identify objects within the view, the specific state being selected by a user;
   receiving, by the digital assistant, a selection of a talk back object selected from the identified objects, the talk back object being an output of the target application at the specific state and having metadata;
   decoding the talk back object to provide a specific audible sound; and
   generating, by the digital assistant, a talk back output corresponding to the target application based on the recorded set of events, the specific audible sound, and the selected talk back object.

2. The medium of claim 1, further comprising, receiving, by the digital assistant, one or more commands selected by the user that, when communicated to the digital assistant by the user, initiate the workflow of the target application and provide the talk back output to the user.

3. The medium of claim 2, wherein the digital assistant is configured to invoke a particular talk back feature responsive to a detected utterance that corresponds to a particular command of the one or more commands.

4. The medium of claim 2, wherein the talk back output is provided on a device other than the mobile device.

5. The medium of claim 2, wherein the talk back output is provided on the mobile device.

6. The medium of claim 2, wherein the talk back output is communicated as an input to another application.

7. The medium of claim 1, further comprising enabling access to the talk back feature stored on the server by other users via digital assistants corresponding to the other users.

8. The medium of claim 1, further comprising determining an entity type for the talk back object.

9. The medium of claim 8, wherein the entity type is determined by the digital assistant based on the metadata.

10. The medium of claim 8, wherein the entity type is determined by a selection made by the user.

11. The medium of claim 8, further comprising adding context to the talk back output, the context corresponding to the entity type.

12. The medium of claim 11, further comprising employing machine learning to (1) suggest the context to add to the talk back output and (2) learn a dialect from the user.

13. The medium of claim 12, further comprising receiving, by the digital assistant, a selection of the context made by the user to add to the talk back output.

14. The medium of claim 1, wherein the talk back feature is embodied in a JSON data structure, and wherein the talk back output was generated without the user manually interacting with an interface or the target application.

15. The medium of claim 2, wherein each command of the one or more commands includes a string representation of a detected audio input.

16. The medium of claim 15, wherein each command of the one or more commands is generated by the mobile device employing a speech-to-text operation, and wherein the detected audio input is a spoken utterance detected by the digital assistant via at least one microphone of the mobile device.

17. The medium of claim 16, wherein each command of the one or more commands includes at least one parameter.

18. A computer-implemented method for providing talk back automation, the method comprising:
- receiving, by a digital assistant executing on a mobile device, a verbal command from a user, the verbal command including a string representation of a detected audio input and generated by the mobile device employing a speech-to- text operation, and wherein the detected audio input is a spoken utterance detected by the digital assistant via at least one microphone of the mobile device, and wherein the verbal command was received without the user manually interacting with an interface or a target application;
- in response to the received verbal command, initiating a workflow of the target application, the workflow corresponding to a set of events;
- receiving a selection of a talk back object selected from a view of the target application at a specific state, and wherein the talk back object includes metadata that enables an entity type to be determined;
- decoding the talk back object to provide a specific audible sound; and
- providing a talk back output corresponding to the target application, the talk back output including context based on the entity type, wherein the talk back output is based on the set of events, the specific audible sound, and the selection of the talk back object.

19. A computerized system for providing talk back automation, the system comprising:
- at least one processor; and
- computer readable memory storing computer usable instructions that, when executed by the at least one processor, cause the at least one processor to:
  - receive, by a digital assistant executing on a mobile device, a verbal talk back add command to add a talk back feature that corresponds to an output of a target application installed on the mobile device, without the verbal talk back add command specifying the target application;
  - initiate, by the digital assistant, a talk back recording mode based on the received verbal talk back add command, wherein the digital assistant in the talk back recording mode is configured to record a set of events that corresponds to a workflow of the target application;
  - analyze, by the digital assistant, a view of the target application at a specific state to identify objects within the view, the specific state being selected by a user;
  - receive, by the digital assistant, a selection of a talk back object selected from the identified objects, the talk back object being an output of the target application at the specific state and having metadata;
  - decoding the talk back object to provide a specific audible sound; and
  - generate, by the digital assistant, talk back output corresponding to the target application based on the recorded set of events, the specific audible sound, and the selection of the selected talk back object, the talk back output embodied in a JSON data structure.

* * * * *